(12) United States Patent
Sawada et al.

(10) Patent No.: US 11,379,327 B2
(45) Date of Patent: Jul. 5, 2022

(54) STORAGE SYSTEM AND REBUILDING METHOD FOR STORAGE SYSTEM

(71) Applicant: Hitachi, Ltd., Tokyo (JP)

(72) Inventors: Sho Sawada, Tokyo (JP); Hidenori Suzuki, Tokyo (JP); Eiju Katsuragi, Tokyo (JP); Shintarou Inoue, Tokyo (JP); Hiroki Fujii, Tokyo (JP)

(73) Assignee: HITACHI, LTD., Tokyo (JP)

( * ) Notice: Subject to any disclaimer, the term of this patent is extended or adjusted under 35 U.S.C. 154(b) by 148 days.

(21) Appl. No.: 17/029,297

(22) Filed: Sep. 23, 2020

(65) Prior Publication Data

US 2021/0191828 A1 Jun. 24, 2021

(30) Foreign Application Priority Data

Dec. 20, 2019 (JP) .............................. JP2019-230631

(51) Int. Cl.
*G06F 11/10* (2006.01)
*G06F 11/20* (2006.01)
*G06F 3/06* (2006.01)

(52) U.S. Cl.
CPC ........ *G06F 11/2094* (2013.01); *G06F 3/0619* (2013.01); *G06F 3/0659* (2013.01); *G06F 3/0689* (2013.01); *G06F 11/1092* (2013.01); *G06F 2201/82* (2013.01)

(58) Field of Classification Search
CPC ............ G06F 11/2094; G06F 11/1092; G06F 11/0619; G06F 11/0659; G06F 11/0689; G06F 11/1088
See application file for complete search history.

(56) References Cited

U.S. PATENT DOCUMENTS

| | | | |
|---|---|---|---|
| 6,516,425 B1 * | 2/2003 | Belhadj ............... | G06F 11/1092 714/E11.034 |
| 9,823,980 B2 * | 11/2017 | Schirripa .............. | G06F 3/0644 |
| 2011/0264949 A1 * | 10/2011 | Ikeuchi ............... | G06F 11/1076 714/E11.054 |
| 2014/0331086 A1 * | 11/2014 | Resch ................... | G06F 3/0619 714/15 |
| 2015/0242145 A1 | 8/2015 | Minamiura | |
| 2018/0107550 A1 * | 4/2018 | Dhuse .................... | G06F 3/067 |
| 2020/0043524 A1 * | 2/2020 | Roberts ............... | G06F 11/1088 |
| 2021/0397360 A1 * | 12/2021 | Vankamamidi ..... | G06F 11/1088 |

FOREIGN PATENT DOCUMENTS

JP 2015158768 A 9/2015

* cited by examiner

*Primary Examiner* — Yolanda L Wilson
(74) *Attorney, Agent, or Firm* — Mattingly & Malur, PC

(57) ABSTRACT

A storage controller of a storage system performs, when failures occur in at least two drives, priority rebuilding and normal rebuilding in parallel, the priority rebuilding being performed so as to perform rebuilding using a reading drive for reading data for restoration of priority rebuild data to be preferentially rebuilt and a writing drive specified for writing the priority rebuild data restored, the normal rebuilding being performed so as to rebuilt normal rebuild data by using a specified reading drive and a specified writing drive.

11 Claims, 28 Drawing Sheets

FIG. 3

·Rebuild management table  135

| Distributed RG # | Drive # | Table effective FLG | Normal copy pointer | Priority copy pointer | Priority-rebuilding bit map | Priority-rebuilt bit map |
|---|---|---|---|---|---|---|
| 0 | 0 | 0x00 | Address A | Address D | 0x00000011 | 0x00000000 |
|   | 1 | 0x00 | Address B | Address E | 0x00000011 | 0x00000011 |
|   | 2 | 0x01 | Address C | Address F | 0xffffffff | 0xffffffff |
| 1 | … | … | … | … | … | … |
| … | … | … | … | … | … | … |

·Distributed-RG mapping management table  136

| Distributed RG # | Data mapping | Spare mapping |
|---|---|---|
| 0 | RAID level: RAID6(2D2P) drive: mapping for 12-drive configuration | Spare mapping A |
| 1 | Mapping B | Spare mapping B |
| 2 | Mapping C | Spare mapping C |
| … | … |   |

·Data mapping table
  ·RAID level: RAID6(2D2P) drive: mapping for 12-drive configuration

137

| 0 | 0 | 0 | 0 | 5 | 2 | 1 | 4 | 7 | 1 | 1 | 3 |
|---|---|---|---|---|---|---|---|---|---|---|---|
| 1 | 3 | 6 | 7 | 8 | 4 | 2 | 11 | 10 | 3 | 2 | 6 |
| 2 | 4 | 8 | 8 | 14 | 5 | 7 | 12 | 11 | 5 | 3 | 9 |
| 4 | 5 | 13 | 9 | 15 | 9 | 13 | 15 | 12 | 6 | 10 | 12 |
| 6 | 7 | 15 | 10 | 16 | 16 | 14 | 18 | 13 | 11 | 17 | 14 |
| 8 | 9 | 16 | 16 | 17 | 20 | 17 | 23 | 18 | 17 | 21 | 19 |
| 10 | 11 | 18 | 19 | 19 | 21 | 21 | 24 | 21 | 19 | 22 | 22 |
| 12 | 13 | 23 | 20 | 20 | 24 | 25 | 26 | 26 | 20 | 23 | 23 |
| 14 | 15 | 24 | 24 | 22 | 28 | 26 | 27 | 28 | 26 | 27 | 25 |
| 18 | 22 | 25 | 25 | 29 | 29 | 27 | 28 | 29 | 29 | 28 | 27 |

·Parcel-group redundancy management table        138

| Distributed RG # | Parcel group # | Redundancy |
|---|---|---|
| 0 | 0 | 0 |
|   | 1 | 1 |
|   | 2 | 2 |
|   | ... | ... |
| 1 | 0 | 2 |
|   | 1 | 2 |
|   | 2 | 2 |
|   | ... | ... |
| ... | ... | ... |

| #0 | #1 | #2 | #3 | #4 | #5 | #6 | #7 | #8 | #9 | #10 | #11 |
|----|----|----|----|----|----|----|----|----|----|-----|-----|
| 0 | 0 | 0 | 0 | 5 | 2 | 1 | 4 | 7 | 1 | 1 | 3 |
| 1 | 3 | 6 | 7 | 8 | 4 | 2 | 11 | 10 | 3 | 2 | 6 |
| 2 | 4 | 8 | 8 | 14 | 5 | 7 | 12 | 11 | 5 | 3 | 9 |
| 4 | 5 | 13 | 9 | 15 | 9 | 13 | 15 | 12 | 6 | 10 | 12 |
| 6 | 7 | 15 | 10 | 16 | 16 | 14 | 18 | 13 | 11 | 17 | 14 |
| 8 | 9 | 16 | 16 | 17 | 20 | 17 | 23 | 18 | 17 | 21 | 19 |
| 10 | 11 | 18 | 19 | 19 | 21 | 21 | 24 | 21 | 19 | 22 | 22 |
| 12 | 13 | 23 | 20 | 20 | 24 | 25 | 26 | 26 | 20 | 23 | 23 |
| 14 | 15 | 24 | 24 | 22 | 28 | 26 | 27 | 28 | 26 | 27 | 25 |
| 18 | 22 | 25 | 25 | 29 | 29 | 27 | 28 | 29 | 29 | 28 | 27 |
| S | S | 1 | 2 | 0 | 6 | 4 | 8 | 14 | 10 | 12 | 18 |
| S | S | 3 | 4 | 7 | 0 | 5 | 9 | 15 | 22 | 13 | 11 |

Spare area (last two rows)

FIG. 9

·Parcel-group redundancy management table

| Distributed RG # | Parcel group # | Redundancy |
|---|---|---|
| 0 | 0 | 0 |
| | 1 | 1 |
| | 2 | 1 |
| | 3 | 1 |
| | 4 | 0 |
| | 5 | 1 |
| | 6 | 1 |
| | 7 | 1 |
| | 8 | 1 |
| | 9 | 1 |
| | 10 | 1 |
| | 11 | 1 |
| | 12 | 1 |
| | 13 | 1 |
| | 14 | 1 |
| | 15 | 1 |
| | 16 | 2 |
| | 17 | 2 |
| | 18 | 1 |
| | 19 | 2 |
| | 20 | 2 |
| | 21 | 2 |
| | 22 | 1 |
| | 23 | 2 |
| | 24 | 2 |
| | 25 | 2 |
| | 26 | 2 |
| | 27 | 2 |
| | 28 | 2 |
| | 29 | 2 |

Priority-rebuilding bit map

0x00000011
          0001

Parcel group #0: targeted for priority rebuilding
Parcel group #1: not targeted for priority rebuilding
Parcel group #2: not targeted for priority rebuilding
Parcel group #3: not targeted for priority rebuilding

FIG. 10

Before failure

| #0 | #1 | #2 | #3 | #4 | #5 | #6 | #7 | #8 | #9 | #10 | #11 |
|----|----|----|----|----|----|----|----|----|----|-----|-----|
| 0  | 0  | 0  | 0  | 5  | 2  | 1  | 4  | 7  | 1  | 1   | 3   |
| 1  | 3  | 6  | 7  | 8  | 4  | 2  | 11 | 10 | 3  | 2   | 6   |
| 2  | 4  | 8  | 8  | 14 | 5  | 7  | 12 | 11 | 5  | 3   | 9   |
| 4  | 5  | 13 | 9  | 15 | 9  | 13 | 15 | 12 | 6  | 10  | 12  |
| 6  | 7  | 15 | 10 | 16 | 16 | 14 | 18 | 13 | 11 | 17  | 14  |
| 8  | 9  | 16 | 16 | 17 | 20 | 17 | 23 | 18 | 17 | 21  | 19  |
| 10 | 11 | 18 | 19 | 19 | 21 | 21 | 24 | 21 | 19 | 22  | 22  |
| 12 | 13 | 23 | 20 | 20 | 24 | 25 | 26 | 26 | 20 | 23  | 23  |
| 14 | 15 | 24 | 24 | 22 | 28 | 26 | 27 | 28 | 26 | 27  | 25  |
| 18 | 22 | 25 | 25 | 29 | 29 | 27 | 28 | 29 | 29 | 28  | 27  |
| S  | S  | S  | S  | S  | S  | S  | S  | S  | S  | S   | S   |
| S  | S  | S  | S  | S  | S  | S  | S  | S  | S  | S   | S   |

After failure (#0, #1)

| #0 | #1 | #2 | #3 | #4 | #5 | #6 | #7 | #8 | #9 | #10 | #11 |
|----|----|----|----|----|----|----|----|----|----|-----|-----|
| 0  | 0  | 0  | 0  | 5  | 2  | 1  | 4  | 7  | 1  | 1   | 3   |
| 1  | 3  | 6  | 7  | 8  | 4  | 2  | 11 | 10 | 3  | 2   | 6   |
| 2  | 4  | 8  | 8  | 14 | 5  | 7  | 12 | 11 | 5  | 3   | 9   |
| 4  | 5  | 13 | 9  | 15 | 9  | 13 | 15 | 12 | 6  | 10  | 12  |
| 6  | 7  | 15 | 10 | 16 | 16 | 14 | 18 | 13 | 11 | 17  | 14  |
| 8  | 9  | 16 | 16 | 17 | 20 | 17 | 23 | 18 | 17 | 21  | 19  |
| 10 | 11 | 18 | 19 | 19 | 21 | 21 | 24 | 21 | 19 | 22  | 22  |
| 12 | 13 | 23 | 20 | 20 | 24 | 25 | 26 | 26 | 20 | 23  | 23  |
| 14 | 15 | 24 | 24 | 22 | 28 | 26 | 27 | 28 | 26 | 27  | 25  |
| 18 | 22 | 25 | 25 | 29 | 29 | 27 | 28 | 29 | 29 | 28  | 27  |
| S  | S  | S  | S  | S  | S  | S  | S  | S  | S  | S   | S   |
| S  | S  | S  | S  | S  | S  | S  | S  | S  | S  | S   | S   |

FIG. 11

Start of priority rebuilding of drive #0

| | #0 | #1 | #2 | #3 | #4 | #5 | #6 | #7 | #8 | #9 | #10 | #11 |
|---|---|---|---|---|---|---|---|---|---|---|---|---|
| | 0 | 0 | 0 | 0 | 5 | 2 | 1 | 4 | 7 | 1 | 1 | 3 |
| | 1 | 3 | 6 | 7 | 8 | 4 | 2 | 11 | 10 | 3 | 2 | 6 |
| | 2 | 4 | 8 | 8 | 14 | 5 | 7 | 12 | 11 | 5 | 3 | 9 |
| | 4 | 5 | 13 | 9 | 15 | 9 | 13 | 15 | 12 | 6 | 10 | 12 |
| | 6 | 7 | 15 | 10 | 16 | 16 | 14 | 18 | 13 | 11 | 17 | 14 |
| | 8 | 9 | 16 | 16 | 17 | 20 | 17 | 23 | 18 | 17 | 21 | 19 |
| | 10 | 11 | 18 | 19 | 19 | 21 | 21 | 24 | 21 | 19 | 22 | 22 |
| | 12 | 13 | 23 | 20 | 20 | 24 | 25 | 26 | 26 | 20 | 23 | 23 |
| | 14 | 15 | 24 | 24 | 22 | 28 | 26 | 27 | 28 | 26 | 27 | 25 |
| | 18 | 22 | 25 | 25 | 29 | 29 | 27 | 28 | 29 | 29 | 28 | 27 |
| | S | S | S | S | 0 | S | 4 | S | S | S | S | S |
| | S | S | S | S | S | S | S | S | S | S | S | S |

▨ : Priority rebuilding target parcel
▦ : Rebuilt data (priority)

Completion of priority rebuilding of drive #0

| | #0 | #1 | #2 | #3 | #4 | #5 | #6 | #7 | #8 | #9 | #10 | #11 |
|---|---|---|---|---|---|---|---|---|---|---|---|---|
| | 0 | 0 | 0 | 0 | 5 | 2 | 1 | 4 | 7 | 1 | 1 | 3 |
| | 1 | 3 | 6 | 7 | 8 | 4 | 2 | 11 | 10 | 3 | 2 | 6 |
| | 2 | 4 | 8 | 8 | 14 | 5 | 7 | 12 | 11 | 5 | 3 | 9 |
| | 4 | 5 | 13 | 9 | 15 | 9 | 13 | 15 | 12 | 6 | 10 | 12 |
| | 6 | 7 | 15 | 10 | 16 | 16 | 14 | 18 | 13 | 11 | 17 | 14 |
| | 8 | 9 | 16 | 16 | 17 | 20 | 17 | 23 | 18 | 17 | 21 | 19 |
| | 10 | 11 | 18 | 19 | 19 | 21 | 21 | 24 | 21 | 19 | 22 | 22 |
| | 12 | 13 | 23 | 20 | 20 | 24 | 25 | 26 | 26 | 20 | 23 | 23 |
| | 14 | 15 | 24 | 24 | 22 | 28 | 26 | 27 | 28 | 26 | 27 | 25 |
| | 18 | 22 | 25 | 25 | 29 | 29 | 27 | 28 | 29 | 29 | 28 | 27 |
| | S | S | S | S | 0 | S | 4 | S | S | S | S | S |
| | S | S | S | S | S | S | S | S | S | S | S | S |

▨ : Priority rebuilding target parcel
▦ : Rebuilt data (priority)

| Drive # | #2 | #3 | #4 | #5 | #6 | #7 | #8 | #9 | #10 | #11 |
|---|---|---|---|---|---|---|---|---|---|---|
| Number of read parcels | 1 | 1 | 0 | 1 | 0 | 1 | 0 | 0 | 0 | 0 |
| Number of written parcels | 0 | 0 | 1 | 0 | 1 | 0 | 0 | 0 | 0 | 0 |

| | #0 | #1 | #2 | #3 | #4 | #5 | #6 | #7 | #8 | #9 | #10 | #11 |
|---|---|---|---|---|---|---|---|---|---|---|---|---|
| | 0 | 0 | 0 | 0 | 5 | 2 | 1 | 4 | 7 | 1 | 1 | 3 |
| | 1 | 3 | 6 | 7 | 8 | 4 | 2 | 11 | 10 | 3 | 2 | 6 |
| Completion of | 2 | 4 | 8 | 8 | 14 | 5 | 7 | 12 | 11 | 5 | 3 | 9 |
| rebuilding of | 4 | 5 | 13 | 9 | 15 | 9 | 13 | 15 | 12 | 6 | 10 | 12 |
| drive #0 | 6 | 7 | 15 | 10 | 16 | 16 | 14 | 18 | 13 | 11 | 17 | 14 |
| | 8 | 9 | 16 | 16 | 17 | 20 | 17 | 23 | 18 | 17 | 21 | 19 |
| | 10 | 11 | 18 | 19 | 19 | 21 | 21 | 24 | 21 | 19 | 22 | 22 |
| | 12 | 13 | 23 | 20 | 20 | 24 | 25 | 26 | 26 | 20 | 23 | 23 |
| | 14 | 15 | 24 | 24 | 22 | 28 | 26 | 27 | 28 | 26 | 27 | 25 |
| | 18 | 22 | 25 | 25 | 29 | 29 | 27 | 28 | 29 | 29 | 28 | 27 |
| | S | S | 1 | 2 | 0 | 6 | 4 | 8 | 14 | 10 | 12 | 18 |
| | S | S | S | S | S | S | S | S | S | S | S | S |

| Drive # | #2 | #3 | #4 | #5 | #6 | #7 | #8 | #9 | #10 | #11 |
|---|---|---|---|---|---|---|---|---|---|---|
| Number of read parcels | 2 | 2 | 2 | 2 | 2 | 2 | 2 | 2 | 2 | 2 |
| Number of written parcels | 1 | 1 | 1 | 1 | 1 | 1 | 1 | 1 | 1 | 1 |

FIG. 14

Start of priority rebuilding and part of normal rebuilding

| #0 | #1 | #2 | #3 | #4 | #5 | #6 | #7 | #8 | #9 | #10 | #11 |
|----|----|----|----|----|----|----|----|----|----|----|----|
| 0 | 0 | 0 | 0 | 5 | 2 | 1 | 4 | 7 | 1 | 1 | 3 |
| 1 | 3 | 6 | 7 | 8 | 4 | 2 | 11 | 10 | 3 | 2 | 6 |
| 2 | 4 | 8 | 8 | 14 | 5 | 7 | 12 | 11 | 5 | 3 | 9 |
| 4 | 5 | 13 | 9 | 15 | 9 | 13 | 15 | 12 | 6 | 10 | 12 |
| 6 | 7 | 15 | 10 | 16 | 16 | 14 | 18 | 13 | 11 | 17 | 14 |
| 8 | 9 | 16 | 16 | 17 | 20 | 17 | 23 | 18 | 17 | 21 | 19 |
| 10 | 11 | 18 | 19 | 19 | 21 | 21 | 24 | 21 | 19 | 22 | 22 |
| 12 | 13 | 23 | 20 | 20 | 24 | 25 | 26 | 26 | 20 | 23 | 23 |
| 14 | 15 | 24 | 24 | 22 | 28 | 26 | 27 | 28 | 26 | 27 | 25 |
| 18 | 22 | 25 | 25 | 29 | 29 | 27 | 28 | 29 | 29 | 28 | 27 |
| S | S | S | S | 0 | S | 4 | S | S | 10 | S | S |
| S | S | S | S | S | S | S | S | S | S | S | S |

Legend:
- ▨ : Priority rebuilding target parcel
- ▦ : Rebuilt data (priority)
- ▧ : Normal rebuilding target parcel
- ▦ : Rebuilt data (normal)

Completion of priority rebuilding and part of normal rebuilding

| #0 | #1 | #2 | #3 | #4 | #5 | #6 | #7 | #8 | #9 | #10 | #11 |
|----|----|----|----|----|----|----|----|----|----|----|----|
| 0 | 0 | 0 | 0 | 5 | 2 | 1 | 4 | 7 | 1 | 1 | 3 |
| 1 | 3 | 6 | 7 | 8 | 4 | 2 | 11 | 10 | 3 | 2 | 6 |
| 2 | 4 | 8 | 8 | 14 | 5 | 7 | 12 | 11 | 5 | 3 | 9 |
| 4 | 5 | 13 | 9 | 15 | 9 | 13 | 15 | 12 | 6 | 10 | 12 |
| 6 | 7 | 15 | 10 | 16 | 16 | 14 | 18 | 13 | 11 | 17 | 14 |
| 8 | 9 | 16 | 16 | 17 | 20 | 17 | 23 | 18 | 17 | 21 | 19 |
| 10 | 11 | 18 | 19 | 19 | 21 | 21 | 24 | 21 | 19 | 22 | 22 |
| 12 | 13 | 23 | 20 | 20 | 24 | 25 | 26 | 26 | 20 | 23 | 23 |
| 14 | 15 | 24 | 24 | 22 | 28 | 26 | 27 | 28 | 26 | 27 | 25 |
| 18 | 22 | 25 | 25 | 29 | 29 | 27 | 28 | 29 | 29 | 28 | 27 |
| S | S | S | S | 0 | S | 4 | S | S | 10 | S | S |
| S | S | S | S | S | S | S | S | S | S | S | S |

| Drive # | #2 | #3 | #4 | #5 | #6 | #7 | #8 | #9 | #10 | #11 |
|---|---|---|---|---|---|---|---|---|---|---|
| Number of read parcels | 1 | 1 | 0 | 1 | 0 | 1 | 1 | 0 | 1 | 0 |
| Number of written parcels | 0 | 0 | 1 | 0 | 1 | 0 | 0 | 1 | 0 | 0 |

FIG. 15

Start of normal rebuilding on unrebuilt parcel group

| #0 | #1 | #2 | #3 | #4 | #5 | #6 | #7 | #8 | #9 | #10 | #11 |
|---|---|---|---|---|---|---|---|---|---|---|---|
| 0 | 0 | 0 | 0 | 5 | 2 | 1 | 4 | 7 | 1 | 1 | 3 |
| 1 | 3 | 6 | 7 | 8 | 4 | 2 | 11 | 10 | 3 | 2 | 6 |
| 2 | 4 | 8 | 8 | 14 | 5 | 7 | 12 | 11 | 5 | 3 | 9 |
| 4 | 5 | 13 | 9 | 15 | 9 | 13 | 15 | 12 | 6 | 10 | 12 |
| 6 | 7 | 15 | 10 | 16 | 16 | 14 | 18 | 13 | 11 | 17 | 14 |
| 8 | 9 | 16 | 16 | 17 | 20 | 17 | 23 | 18 | 17 | 21 | 19 |
| 10 | 11 | 18 | 19 | 19 | 21 | 21 | 24 | 21 | 19 | 22 | 22 |
| 12 | 13 | 23 | 20 | 20 | 24 | 25 | 26 | 26 | 20 | 23 | 23 |
| 14 | 15 | 24 | 24 | 22 | 28 | 26 | 27 | 28 | 26 | 27 | 25 |
| 18 | 22 | 25 | 25 | 29 | 29 | 27 | 28 | 29 | 29 | 28 | 27 |
| S | S | 11 | 2 | 0 | S | 4 | S | S | 10 | S | S |
| S | S | S | S | S | S | S | S | S | S | S | S |

▨ : Normal rebuilding target parcel
▦ : Rebuilt data (normal)

Completion of normal rebuilding

| #0 | #1 | #2 | #3 | #4 | #5 | #6 | #7 | #8 | #9 | #10 | #11 |
|---|---|---|---|---|---|---|---|---|---|---|---|
| 0 | 0 | 0 | 0 | 5 | 2 | 1 | 4 | 7 | 1 | 1 | 3 |
| 1 | 3 | 6 | 7 | 8 | 4 | 2 | 11 | 10 | 3 | 2 | 6 |
| 2 | 4 | 8 | 8 | 14 | 5 | 7 | 12 | 11 | 5 | 3 | 9 |
| 4 | 5 | 13 | 9 | 15 | 9 | 13 | 15 | 12 | 6 | 10 | 12 |
| 6 | 7 | 15 | 10 | 16 | 16 | 14 | 18 | 13 | 11 | 17 | 14 |
| 8 | 9 | 16 | 16 | 17 | 20 | 17 | 23 | 18 | 17 | 21 | 19 |
| 10 | 11 | 18 | 19 | 19 | 21 | 21 | 24 | 21 | 19 | 22 | 22 |
| 12 | 13 | 23 | 20 | 20 | 24 | 25 | 26 | 26 | 20 | 23 | 23 |
| 14 | 15 | 24 | 24 | 22 | 28 | 26 | 27 | 28 | 26 | 27 | 25 |
| 18 | 22 | 25 | 25 | 29 | 29 | 27 | 28 | 29 | 29 | 28 | 27 |
| S | S | 11 | 2 | 0 | 6 | 4 | 8 | 14 | 10 | 12 | 18 |
| S | S | S | S | S | S | S | S | S | S | S | S |

▨ : Normal rebuilding target parcel
▦ : Rebuilt data (normal)

| Drive # | #2 | #3 | #4 | #5 | #6 | #7 | #8 | #9 | #10 | #11 |
|---|---|---|---|---|---|---|---|---|---|---|
| Number of read parcels | 1 | 1 | 2 | 1 | 2 | 1 | 1 | 2 | 1 | 2 |
| Number of written parcels | 1 | 1 | 0 | 1 | 0 | 1 | 1 | 0 | 1 | 1 |

FIG. 16

STORAGE SYSTEM AND REBUILDING METHOD FOR STORAGE SYSTEM

CROSS-REFERENCE TO PRIOR APPLICATION

This application relates to and claim the benefit of priority from Japanese Patent Application No. 2019-230631 filed on Dec. 20, 2019 the entire disclosure of which is incorporated herein by reference.

BACKGROUND

The present invention relates to a storage system and a rebuilding method for the storage system.

In a storage system where RAID (Redundant Arrays of Independent (or Inexpensive) Disks) is configured using a plurality of disk drives, each of the drives includes a spare area and data is restored (rebuilt) in the spare area when a failure occurs in at least one of the drives, instead of data restoration in an external spare drive. Such a technique is known as a distributed RAID.

Furthermore, in a storage system constituting a distributed RAID, data assigned with a high priority is selected during rebuilding and the data assigned with a high priority is rebuilt prior to other data. Such a technique is known as priority rebuilding.

Background arts of the present technical field include Japanese Patent Application Publication No. 2015-158768. According to Japanese Patent Application Publication No. 2015-158768, "Provided is a storage device including a plurality of storages, each of which has a first storage area for storing data and a second storage area for storing the same data as some segments of the data stored in the first storage area, the storages storing a plurality of distributed data segments belonging to the same management unit, and a control unit for setting, for each management unit, a usage ratio of the second storage area in each of the storages based on a priority set for each management unit." (see ABSTRACT).

During priority rebuilding in the background art, other rebuilding operations are not performed. Thus, it takes a long time to finally restore data stored in a failed drive.

The present invention has been devised in view of the problem. An object of the present invention is to provide a storage system and a rebuilding method for the storage system, which can increase the speed of restoration of data stored in a faulty drive in the storage system having a distributed RAID configuration.

SUMMARY

In order to solve the problem, a storage system according to one aspect of the present invention includes a plurality of drives and a processor configured to construct a distributed RAID including the drives, wherein the processor is configured to perform, in rebuilding which is performed when failures occur in at least two drives of the plurality of drives and in which data stored in the at least two drives is restored to another drive of the plurality of drives, priority rebuilding and normal rebuilding in parallel, the priority rebuilding being performed such that priority rebuild data to be preferentially rebuilt is selected and then is rebuilt using a reading drive specified for reading the data for restoration of the priority rebuild data and a writing drive specified for writing the priority rebuild data restored, the normal rebuilding being performed such that normal rebuild data that is the data other than the priority rebuild data is rebuilt using a specified reading drive and a specified writing drive.

The present invention achieves a storage system and a rebuilding method for the storage system, which can increase the speed of restoration of data stored in a faulty drive in the storage system having a distributed RAID configuration.

BRIEF DESCRIPTION OF THE DRAWINGS

FIG. 3 illustrates an example of a rebuild management table for the storage system according to embodiment 1;

FIG. 4 illustrates an example of a distributed-RG mapping management table for the storage system according to embodiment 1;

FIG. 5 illustrates an example of a data mapping table for the storage system according to embodiment 1;

FIG. 6 illustrates an example of a parcel-group redundancy management table for the storage system according to embodiment 1;

FIG. 8 illustrates an example of a spare mapping image of the storage system according to embodiment 1;

FIG. 9 illustrates an example of a priority-rebuilding bit map for the storage system according to embodiment 1;

FIG. 10 is an explanatory drawing illustrating an example of the flow of rebuilding in an ordinary storage system;

FIG. 11 is an explanatory drawing illustrating another example of the flow of rebuilding in the ordinary storage system;

FIG. 12 is an explanatory drawing illustrating still another example of the flow of rebuilding in the ordinary storage system;

FIG. 13 is an explanatory drawing illustrating still another example of the flow of rebuilding in the ordinary storage system;

FIG. 14 is an explanatory drawing illustrating an example of the flow of rebuilding in the storage system according to embodiment 1;

FIG. 15 is an explanatory drawing illustrating another example of the flow of rebuilding in the storage system according to embodiment 1;

FIG. 16 is an explanatory drawing illustrating an example of the flow of rebuilding in the storage system according to a modification of embodiment 1;

DETAILED DESCRIPTION OF THE EMBODIMENT

Figure 1:
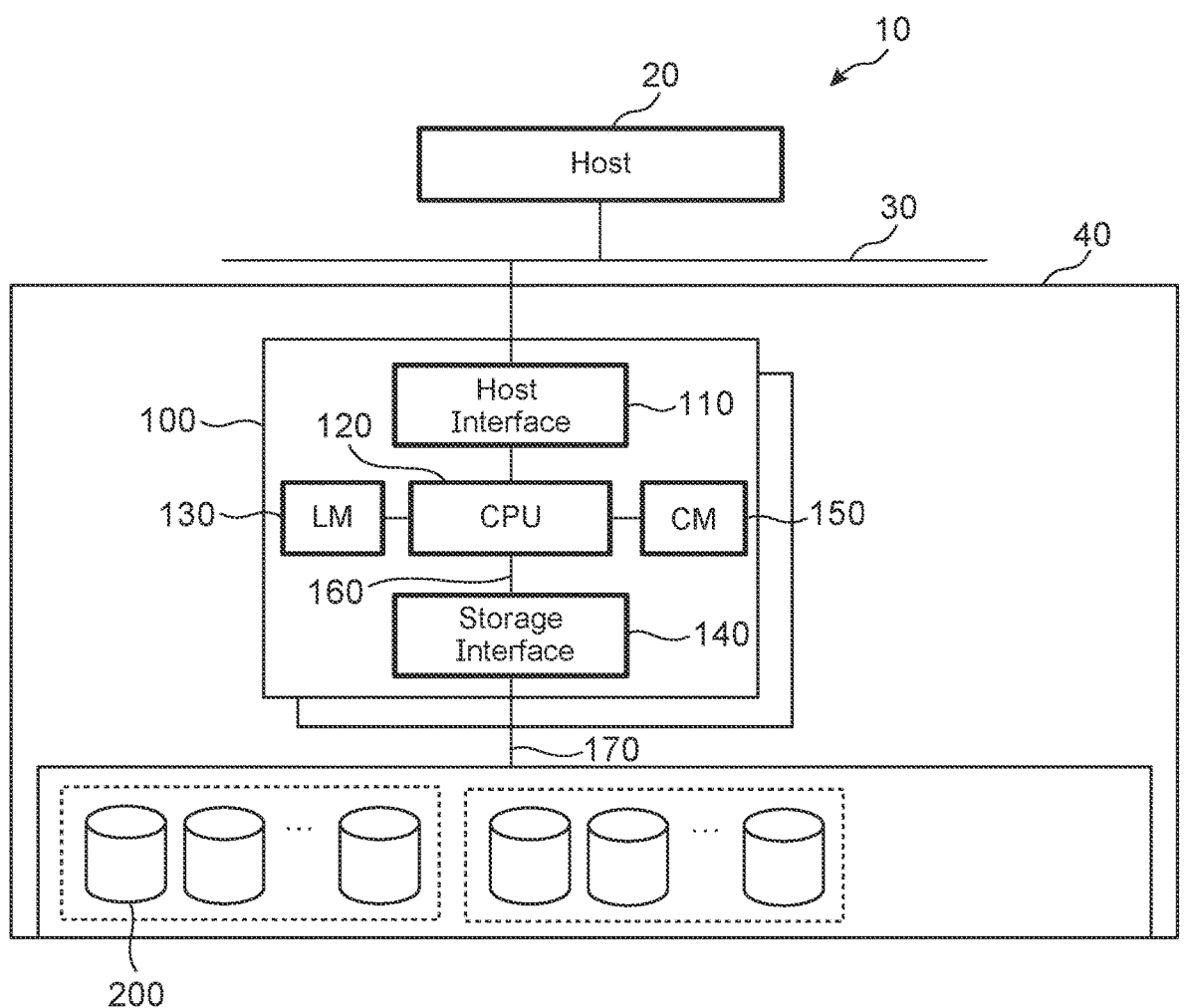
FIG. 1 illustrates the hardware configuration of a storage system according to embodiment 1.

Embodiments of the present invention will be described below in accordance with the accompanying drawings. The following description and drawings are illustrations for explaining the present invention. Omissions and simplifications are optionally made for clarifying the explanation. The present invention can be implemented in other various forms. Constituent elements may be represented in singular or plural forms unless otherwise specified.

In the drawings for explaining the embodiments, parts having the same functions are indicated by the same reference numerals and a repeated explanation thereof is omitted.

The positions, sizes, shapes, and ranges of constituent elements in the drawings may not indicate actual positions, sizes, shapes, and ranges in order to enhance understanding of the invention. Thus, the present invention is not always limited to the positions, sizes, shapes, and ranges that are disclosed in the drawings.

In the following explanation, various kinds of information will be described using expressions such as "table," "list", and "queue." The information may be represented as data structures other than the expressions. For example, "XX table" or "XX list" may be denoted as "XX information" in order to indicate independence from data structures. In the explanation of identification information, expressions such as "identification information," "identifier," "name," "ID," and "number" may be replaced with one another.

Moreover, the configuration of each table is merely exemplary in the following explanation. One table may be divided into two or more tables or two or more tables may be partially or entirely used as one table.

A plurality of constituent elements having the same or similar functions may be described with the same reference numeral attached with different subscripts. If it is not necessary to discriminate between the constituent elements, the subscripts may be omitted.

In the following explanation, processing performed by executing a program will be described. The program is executed by a processor (e.g., a CPU or a GPU), so that predetermined processing is performed by optionally using a storage resource (e.g., memory) and/or an interface device (e.g., a communication port). Thus, the processing may be mainly performed by the processor. Likewise, the processing by the program may be mainly performed by a controller, an apparatus, a system, a computer, or a node that includes a processor. The processing by the program may be performed as long as the processing is mainly performed by an arithmetic section. The arithmetic section may include a dedicated circuit (e.g., an FPGA or an ASIC) for performing specific processing.

In the following explanation, "processor (unit)" is at least one processor. The at least one processor is typically a microprocessor, e.g., CPU (Central Processing Unit). Other kinds of processors such as a GPU (Graphics Processing Unit) may be used instead. The at least one processor may be a single-core processor or a multi-core processor.

Alternatively, the at least one processor may be a general processor, for example, a hardware circuit (e.g., an FPGA (Field-Programmable Gate Array) or an ASIC (Application Specific Integrated Circuit)) for performing at least part of processing.

In the following explanation, "interface unit" may be at least one interface. The at least one interface may be at least one communication interface device of the same kind (e.g., at least one NIC (Network Interface Card)) or two or more communication interface devices of different kinds (e.g., an NIC and an HBA (Host Bus Adapter)).

In the following explanation, "memory (unit)" is at least one memory that is typically a main storage device. At least one memory in the memory unit may be volatile memory or nonvolatile memory.

The program may be installed in an apparatus like a computer from a program source. The program source may be, for example, a program distribution server or a storage medium readable by a computer. If the program source is a program distribution server, the program distribution server includes a processor and a storage resource for storing a program to be distributed. The processor of the program distribution server may distribute the program to be distributed, to another computer. In the following explanation, two or more programs may be implemented as one program or one program may be implemented as two or more programs.

In the present disclosure, the storage device includes one storage drive, e.g., one HDD (Hard Disk Drive) or an SSD (Solid State Drive), a RAID device including a plurality of storage drives, and a plurality of RAID devices. In the case of an HDD, the storage device may include, for example, an SAS (Serial Attached SCSI) HDD or a NL-SAS (Near Line SAS) HDD.

Terms used in the present specification will be described below.

Parcel: a unit for managing data on a distributed RG (Raid Group). Parcel includes a predetermined number of consecutive stripes in which LBAs (Logical Block Addressing) are consecutive.

Figure 7:
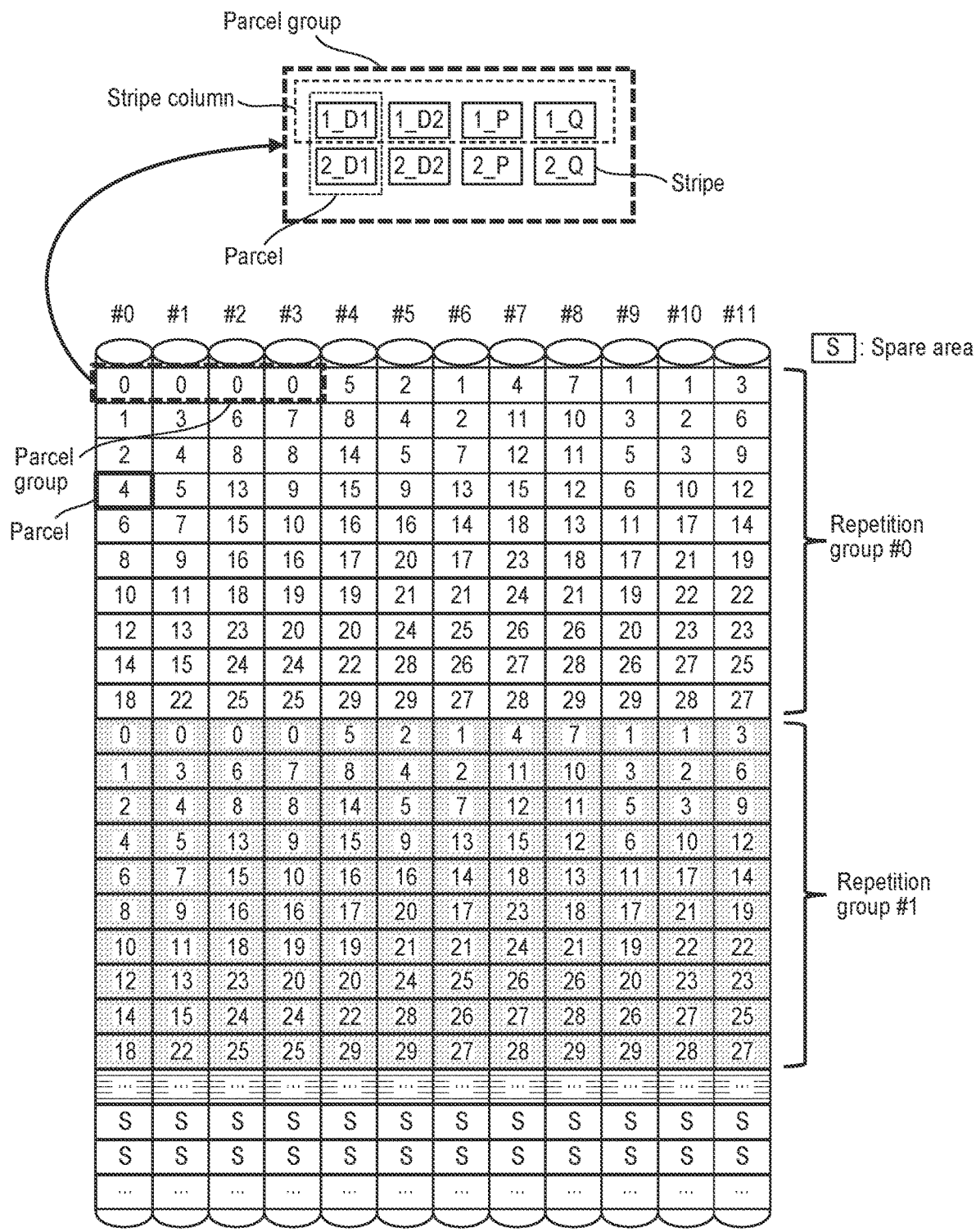
FIG. 7 illustrates an example of a mapping image of the storage system according to embodiment 1.

Parcel group: a parcel sequence includes a predetermined number of consecutive stripe columns in which LBAs are consecutive. In the case of a RAID configuration of 2D+2P, the configuration includes four parcels. FIG. 7 illustrates that parcels of the same number in a repetition group belong to the same parcel group.

Repetition group: a unit for repeating mapping. In FIG. 7, a data mapping table of 10×12 in FIG. 5 is used as a unit of the repetition group.

Mapping of a distributed RG (Raid Group): the distributed RG performs mapping by repeating the same pattern according to a drive capacity. In FIG. 7, mapping is performed by repeating the pattern of the data mapping table of 10×12 in FIG. 5.

Embodiment 1

Embodiment 1 will be described below with reference to the accompanying drawings.

FIG. 1 illustrates the hardware configuration of a storage system according to embodiment 1.

A storage system 10 according to embodiment 1 is configured with a host computer (hereinafter, will be referred to as a host) 20 coupled to the storage system 10. The storage system 10 and the host 20 can communicate with each other via a network 30. The network 30 is, for example, a SAN (Storage Area Network) or a LAN (Local Area Network).

The storage system 10 includes a storage apparatus 40 and a storage controller 100 coupled to the storage apparatus 40. The storage apparatus 40 includes a plurality of storage devices 200. For example, the storage devices 200 are coupled to one another via switches, which are not illustrated, and End-to-End communications can be performed among the storage devices 200. The storage devices 200 are coupled to the storage controller 100 via the switches, which are not illustrated.

The storage controller 100 includes a host interface 110 that is a device for communicating with the host 20, a CPU (Central Processing Unit) 120 for controlling the operations of the overall storage system 10, a local memory 130 for temporarily storing storage management information used by the CPU 120 during data transfer, data written from the host 20, and data read from the storage devices 200, a storage interface 140 that is a device for communicating with the storage devices 200, and a cache memory 150. These parts are coupled to one another via internal buses (e.g., a PCI-Express (PCIe) bus, an AXI (Advanced eXtensible Interface) bus) 160. In this configuration, the internal buses 160 are all denoted as the same reference numeral. The internal buses may include buses of the same bus standard or buses of different bus standards. The storage interface 140 in the storage controller 100 is coupled to the storage devices 200 via a PCIe bus 170.

In the present embodiment, as will be specifically described later, the RAID group of RAID 6 (2D+2P) is configured based on the 12 storage devices 200.

The RAID has several levels (hereinafter, will be referred to as "RAID levels"). For example, in RAID 5, data to be written is divided into data segments of a predetermined size (hereinafter, will be referred to as "data unit" for convenience). The data to be written is specified from a host computer corresponding to RAID 5. Each data unit is divided into a plurality of data elements. The data elements are written into respective stripes in the same stripe column.

In RAID 5, in order to restore (rebuild) data elements that cannot be read from the storage device 200 because of a failure of the storage device 200, redundant information called "parity" (hereinafter, will be referred to as "redundant code") is generated for each data unit. The redundant code is also written into the stripes in the same stripe column as the data elements.

For example, if the number of storage devices 200 constituting the RAID group of the RAID 5 is four, three data elements constituting a data unit are written into three stripes for three of the storage devices 200, and the redundant code is written into the stripe corresponding to the other data storage device 200.

For example, in RAID stripe 0, parity 0 is generated based on data 0, data 1, and data 2. Parity 0 is generated by the addition without carry (hereinafter, will be referred to as an XOR operation) of data 0, data 1, and data 2. Data 0, data 1, data 2, and parity 0 are each stored in the storage device 200. If data 1 cannot be read due to a failure or the like of the storage device 200, data 1 is restored by an XOR operation of data 0, data 2, and parity 0.

In RAID 6, two kinds of redundant codes (called P parity and Q parity) are generated for each data unit and the redundant codes are written into stripes in the same stripe column. Thus, if two of the data elements constituting a data unit cannot be read, the two data elements can be restored.

Other RAID levels are also available (for example, RAID 1 to 4). Techniques for data redundancy include triplication and a triple parity technique using three parities. As techniques for generating redundant codes, various techniques such as Reed-solomon codes using Galois operations and EVEN-ODD are available. In the following explanation, RAID 6 will be mainly described. The redundancy technique can be replaced with the above-mentioned methods.

Figure 2:
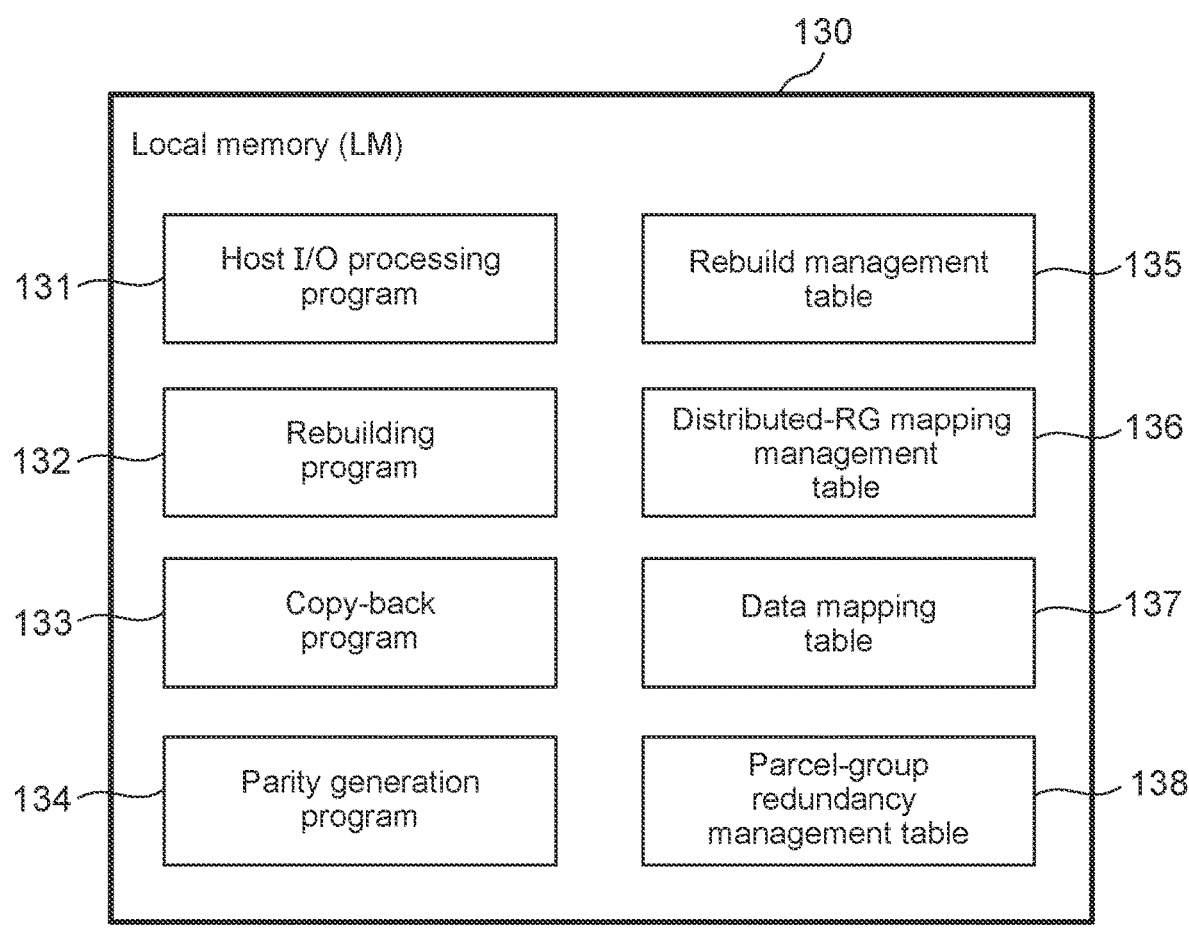
FIG. 2 illustrates an example of the configuration of memory in a storage controller for the storage system according to embodiment 1.

FIG. 2 illustrates an example of the configuration of the local memory 130 in the storage controller 100 of the storage system 10 according to embodiment 1, and more specifically illustrates an example of programs and management information in the local memory 130.

In the local memory 130, a host-interface processing program 131, a rebuilding program 132, a copy-back program 133, and a parity processing program 134 are stored.

The host-interface processing program 131 is a program for communications with the storage controller 100 and the host 20. The rebuilding program 132 is a program for rebuilding that includes rebuilding performed as a characteristic of the present embodiment as will be described later. After the rebuilding by the rebuilding program 132, the copy-back program 133 copies the data of a spare area to the new storage device 200 after the replacement of the storage device 200. After the completion of the processing, the storage apparatus 40 is placed into a normal state. The parity processing program 134 generates the parity and writes the parity at a predetermined position of the storage device 200. Furthermore, programs that are not illustrated are also stored in the local memory 130.

Moreover, a rebuild management table 135, a distributed-RG mapping management table 136, a data mapping table 137, and a parcel-group redundancy management table 138 are stored as management information in the local memory 130.

The configuration examples of the tables as management information will be described below.

FIG. 3 illustrates an example of the rebuild management table 135 of the storage system 10 according to embodiment 1.

The rebuild management table 135 holds information on rebuilding. The rebuild management table 135 has entries for each distributed RG. The entries are a distributed RG #301 that is information on the number of a target distributed RG, a drive #302 that is information on the number of a drive (storage device 200), a table effective flag (FLG) 303 that is information on a table effective flag, a normal copy pointer 304 that is pointer information at a copy positing during normal rebuilding, a priority copy pointer 305 that is pointer information at a copy position during priority rebuilding, a priority-rebuilding bit map 306 that is information on a priority-rebuilding bit map, and a priority-rebuilt bit map 307 that is information on a priority-rebuilt bit map. The priority-rebuilding bit map and the priority-rebuilt bit map will be specifically described later.

FIG. 4 illustrates an example of the distributed-RG mapping management table 136 of the storage system 10 according to embodiment 1.

The distributed-RG mapping management table 136 holds information on the mapping of a distributed RG. The distributed-RG mapping management table 136 has entries for each distributed RG. The entries are a distributed RG #401 that is information on the number of a target distributed RG, data mapping 402 that is information on data mapping, and spare mapping 403 that is information on spare mapping. FIG. 5 illustrates an example of the data mapping table 137 of the storage system 10 according to embodiment 1.

As described above, the storage system 10 of the present embodiment has a RAID level of RAID 6 (2D+2P) and includes the 12 storage devices 200. FIG. 5 illustrates the data mapping table 137 at this point. In the present embodiment, data is mapped so as to equalize the number of read parcels in the storage devices 200 as much as possible during rebuilding.

FIG. 6 illustrates an example of the parcel-group redundancy management table 138 of the storage system 10 according to embodiment 1.

The parcel-group redundancy management table 138 holds information on the redundancy of parcel groups. The parcel-group redundancy management table 138 has entries for each distributed RG. The entries are a distributed RG #501 that is information on the number of a target distributed RG, a parcel group #502 that is information on the number of a parcel group, and redundancy 503 that is information on redundancy.

FIG. 7 illustrates an example of the mapping image of the storage system 10 according to embodiment 1.

As described above, the storage system 10 of the present embodiment has a RAID level of RAID 6 (2D+2P) and includes the 12 (shown as #0 to #11 in FIG. 7) storage devices 200. Data written into the storage device 200 is divided into data units of a predetermined size and each of the data units is divided into a plurality of data elements. The data elements are written into respective stripes in the same stripe column. In the present embodiment, four stripes constitute a stripe column. The stripe column includes the two stripes for storing data D, the single stripe for storing P parity based on the data D, and the single stripe for storing Q parity based on the data D. Hereinafter, a unit includes stripes in which LBAs are consecutive will be referred to as "parcel" and a parcel sequence includes stripe columns in which LBAs are consecutive will be referred to as "parcel group." FIG. 7 illustrates that parcels indicated by the same number belong to the same parcel group. Each of the storage devices 200 has a spare area (shown as "S" in FIG. 7). The spare area is used during rebuilding, which will be describe later, and data is not stored in the spare area under normal conditions.

FIG. 8 illustrates an example of the spare mapping image of the storage system 10 according to embodiment 1.

As described above, the storage system 10 of the present embodiment has a RAID level of RAID 6 (2D+2P) and includes the 12 storage devices 200. FIG. 8 illustrates the mapping of data written into the spare area by rebuilding if failures occur in the storage devices #0 and #1 of the storage devices 200. In order to maintain the redundancy of a parcel group including parcels to be rebuilt, spare mapping is performed such that the parcels to be rebuilt during rebuilding are written into the storage device 200 that does not contain the parcels of the parcel group including the parcels to be built. In the present embodiment, the parcels of a parcel group #1 stored in the storage device 200 #0 are rebuilt during rebuilding and the rebuilt parcels are written into the spare area of the storage device 200 #2.

FIG. 9 illustrates an example of the priority-rebuilding bit map 306 of the storage system 10 according to embodiment 1.

The priority-rebuilding bit map 306 is generated from the parcel-group redundancy management table 138. The priority-rebuilding bit map 306 is a bit map indicating whether each parcel group is a target of priority rebuilding. The priority-rebuilding bit map 306 is a hexadecimal number having a predetermined number of digits. For example, the first digit of the priority-rebuilding bit map in FIG. 9 corresponds to parcel groups #0 to #3.

In the present embodiment, a parcel group with redundancy of 0 is the target of priority rebuilding. The parcel-group redundancy management table 138 in FIG. 9 is based on redundancy when failures occur in the storage devices 200 #0 and #1. Among the parcel groups #0 to #3, only the parcel group #0 has redundancy of 0. Thus, 0001, a binary number, constitutes the first digit of the priority-rebuilding bit map and thus is expressed as "1" in hexadecimal notation. Priority-rebuilding bit maps are similarly generated for other digits.

The outline of rebuilding in the storage system 10 according to the present embodiment will be described below. Referring to FIGS. 10 to 13, the flow of rebuilding in an ordinary storage system will be first described below.

FIGS. 10 to 13 are explanatory drawings illustrating an example of the flow of rebuilding in the ordinary storage system. Like the storage system 10 of embodiment 1, the illustrated ordinary storage system has a RAID level of RAID 6 (2D+2P) and includes 12 storage devices.

The upper part of FIG. 10 illustrates that no failure occurs in the storage devices and the lower part of FIG. 10 illustrates that failures occur in storage devices #0 and #1 of the storage devices.

When the storage system detects failures in the storage devices #0 and #1 of the storage devices, the storage system starts priority rebuilding as illustrated in the upper part of FIG. 11. In the upper part of FIG. 11, priority rebuilding is started for the storage device #0.

As illustrated, for a parcel group #0 (a parcel group including a parcel denoted as "0"), data is rebuilt in the spare area of the storage device #4 by using parcels stored in the storage devices #2 and #3. For a parcel group #4, data is rebuilt in the spare area of the storage device #6 by using parcels stored in the storage devices #5 and #7. The parcel groups #0 and #4 are relevant to parcels stored in both of the storage devices #0 and #1 and the redundancy of the parcel groups is 0, so that the parcel groups are the targets of priority rebuilding. Hence, the priority rebuilding is completed and the data is rebuilt as illustrated in the lower part of FIG. 11.

Figure 12:
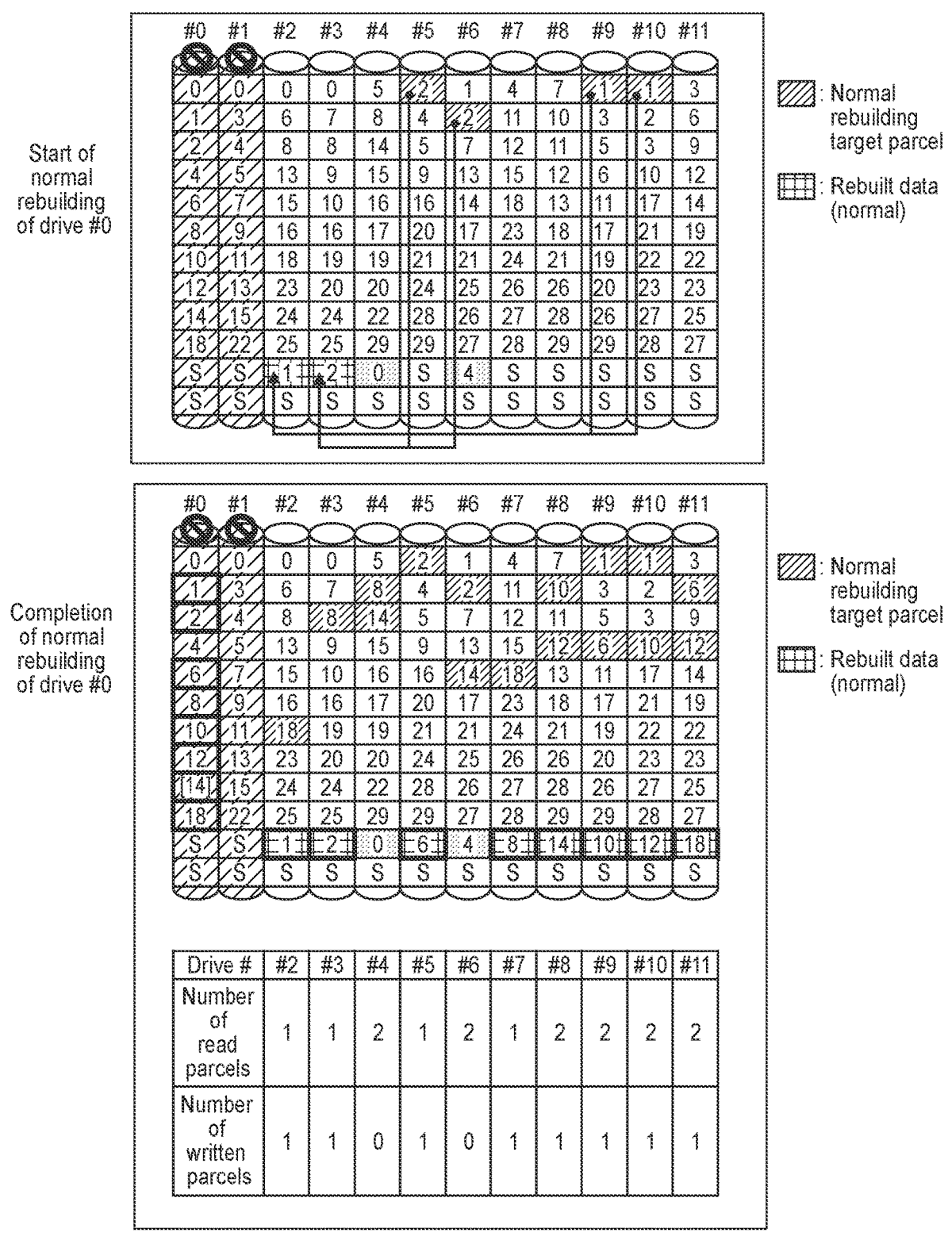

At the completion of the priority rebuilding, the storage system then performs normal rebuilding on the storage device #0 as illustrated in the upper part of FIG. 12. Thus, the normal rebuilding on the storage device #0 is completed as illustrated in the lower part of FIG. 12. Finally, as illustrate in FIG. 13, rebuilding on the storage device #0 is completed through the priority rebuilding and normal rebuilding.

However, in the ordinary storage system, normal rebuilding is performed after the completion of priority rebuilding as described above. Finally, it takes a long time to complete rebuilding as illustrated in FIG. 13.

Hence, in the storage system 10 of embodiment 1, in the presence of the storage device 200 where parcels are not read or written in addition to a reading drive and a writing drive that are the storage devices 200 where parcels are read and written during priority rebuilding, normal rebuilding is performed using parcels stored in the storage device 200 (drive) as the target of normal rebuilding. This shortens the rebuilding time.

Specifically, as illustrated in the upper part of FIG. 14, from among the storage devices 200 other than the storage devices 200 #2, #3, #5, and #7 used as reading drives and the storage devices 200 #4 and #6 used as writing drives during priority rebuilding, the storage devices 200 #8 and #10 containing parcels belonging to the parcel group #10, which may be subjected to normal rebuilding, are not used as reading drives or writing drives during priority rebuilding. Furthermore, the storage device 200 #9, in which data rebuilt using the parcels belonging to the parcel group #10 is written, is not used as a reading drive or a writing drive during priority rebuilding. Thus, the storage controller 100 performs normal rebuilding in synchronization with priority rebuilding by using parcels stored as the target of normal rebuilding in the storage devices 200 that are not used as reading drives or writing drives during priority rebuilding. This completes, as illustrated in the lower part of FIG. 14, rebuilding of some of the parcel groups including parcels as the target of priority rebuilding and the parcel groups including parcels as the target of normal rebuilding.

Thereafter, as illustrated in the upper part of FIG. 15, the storage controller 100 performs normal rebuilding on the parcel groups that are not the target of rebuilding in FIG. 14. Thus, the normal rebuilding is completed as illustrated in the lower part of FIG. 15.

Referring to the flowcharts of FIGS. 17 to 23, the operations of the storage system 10 according to the present embodiment will be described below.

Figure 17:
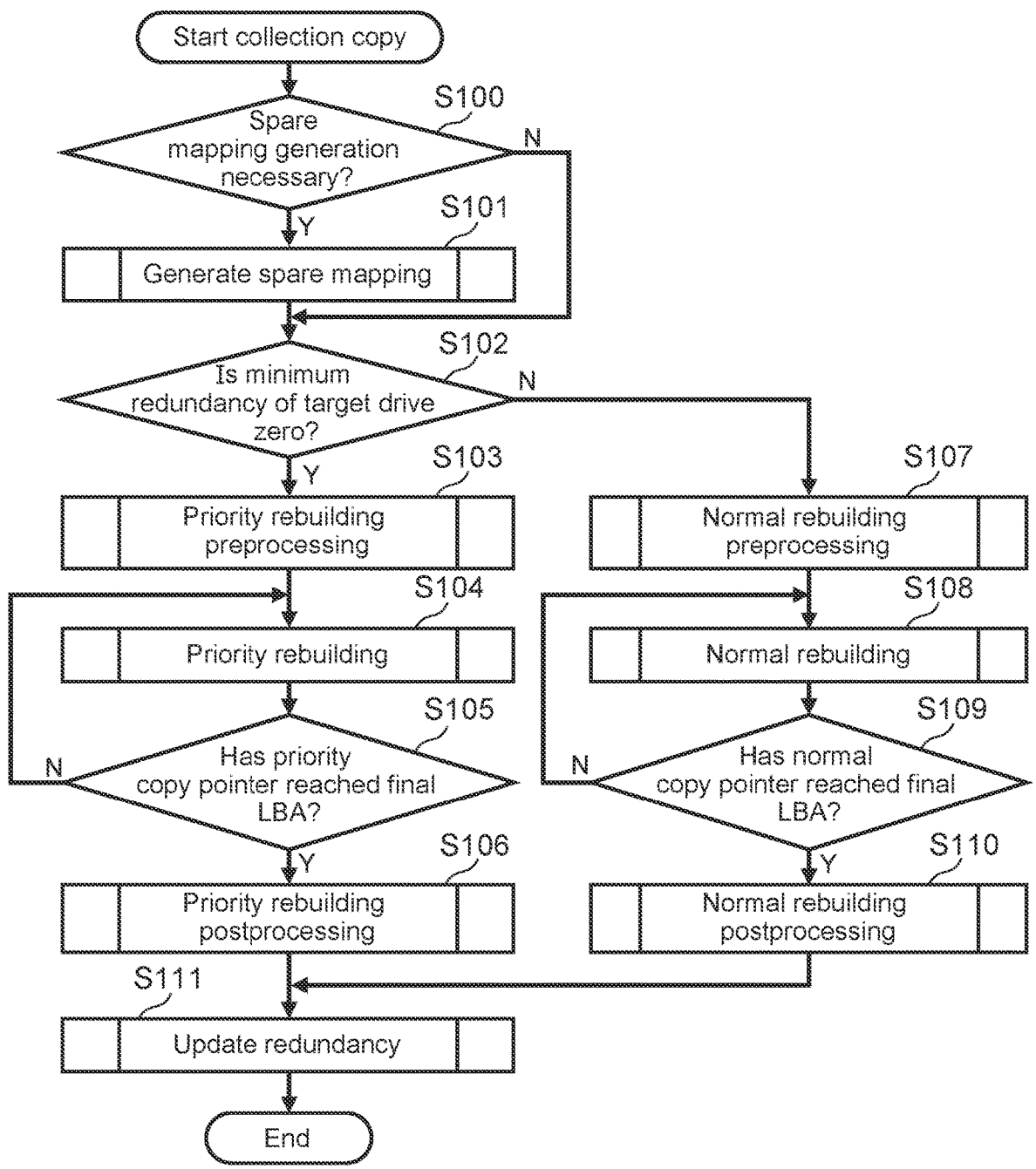
FIG. 17 is a flowchart for explaining an example of the start of collection copy for the storage system according to embodiment 1.

FIG. 17 is a flowchart for explaining an example of the start of collection copy for the storage system 10 according to embodiment 1.

First, the rebuilding program 132 of the storage controller 100 determines the necessity or unnecessity of spare mapping generation (step S100). If the rebuilding program 132 determines that the generation is necessary (YES in step S100), the rebuilding program 132 generates spare mapping (step S101). If the rebuilding program 132 determines that the generation is unnecessary (NO in step S100), the process advances to step S102.

Subsequently, the rebuilding program 132 determines whether the minimum redundancy of a faulty drive (storage device 200) is 0 or not (step S102). If the rebuilding program 132 determines that the minimum redundancy of the drive is 0 (YES in step S102), the rebuilding program 132 performs priority rebuilding preprocessing (step S103). Furthermore, priority rebuilding is performed (step S104) until a priority copy pointer reaches a final LBA (YES in step S105). The rebuilding program 132 then performs priority rebuilding postprocessing (step S106). The priority rebuilding preprocessing, the priority rebuilding, and the priority rebuilding postprocessing will be specifically described later.

If the rebuilding program 132 determines that the minimum redundancy of the drive is not 0 (equal to or larger than 1) (NO in step S102), the rebuilding program 132 performs normal rebuilding preprocessing (step S107). Furthermore, normal rebuilding is performed (step S108) until a normal copy pointer reaches the final LBA (YES in step S109). The rebuilding program 132 then performs normal rebuilding postprocessing (step S110). The normal rebuilding preprocessing, the normal rebuilding, and the normal rebuilding postprocessing will be specifically described later.

The rebuilding program 132 then update the redundancy (step S111).

Figure 18:
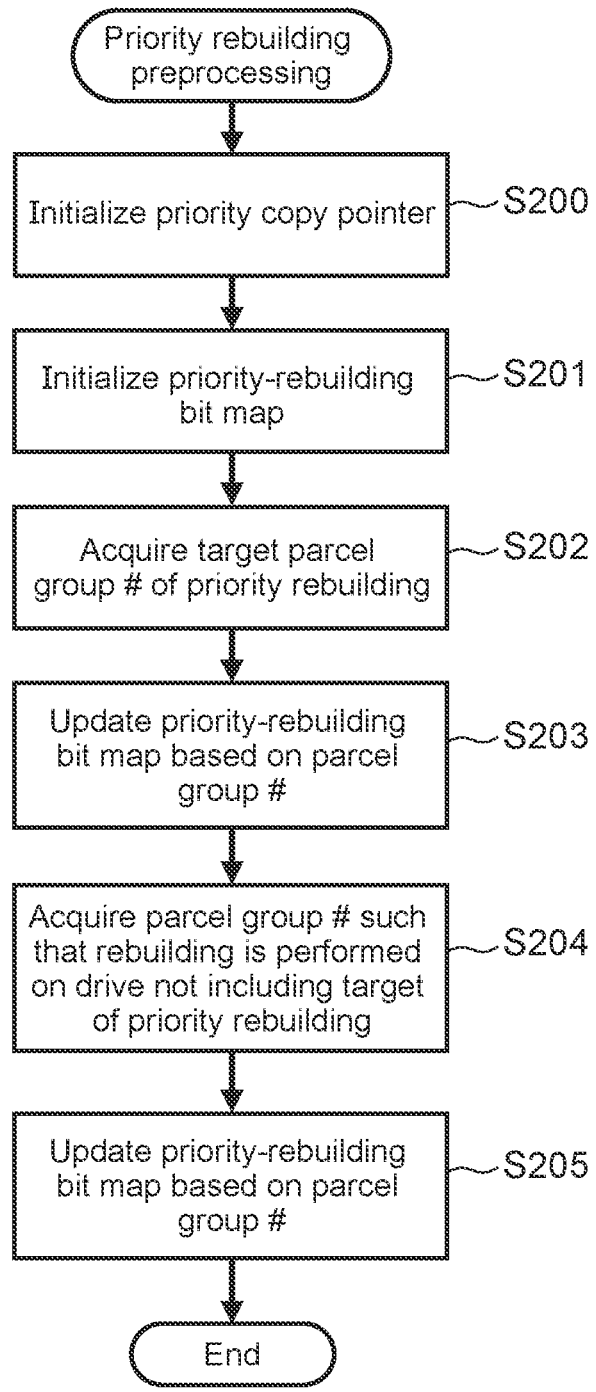
FIG. 18 is a flowchart for explaining an example of the priority rebuilding preprocessing of the storage system according to embodiment 1.

FIG. 18 is a flowchart for explaining an example of the priority rebuilding preprocessing of the storage system 10 according to embodiment 1. The flowchart in FIG. 18 indicates the detail of the processing of step S103 in the flowchart of FIG. 17.

The rebuilding program 132 first initializes the priority copy pointer 305 of the rebuild management table 135 (step S200). The rebuilding program 132 then initializes the priority-rebuilding bit map 306 of the rebuild management table 135 (step S201).

The rebuilding program 132 then acquires a parcel group # as a target of priority rebuilding with reference to the parcel-group redundancy management table 138 (step S202). The rebuilding program 132 then updates the priority-rebuilding bit map 306 of the rebuild management table 135 based on the parcel group # acquired in step S202 (step S203).

In order to perform rebuilding for the drive (storage device 200) not including the target of priority rebuilding, the rebuilding program 132 acquires the parcel group # with reference to the distributed-RG mapping management table 136 and the parcel-group redundancy management table 138 such that rebuilding is performed on the drive (storage device 200) not including the target of priority rebuilding (step S204). The rebuilding program 132 then updates the priority-rebuilding bit map 306 of the rebuild management table 135 based on the parcel group # acquired in step S204 (step S205).

Figure 19:
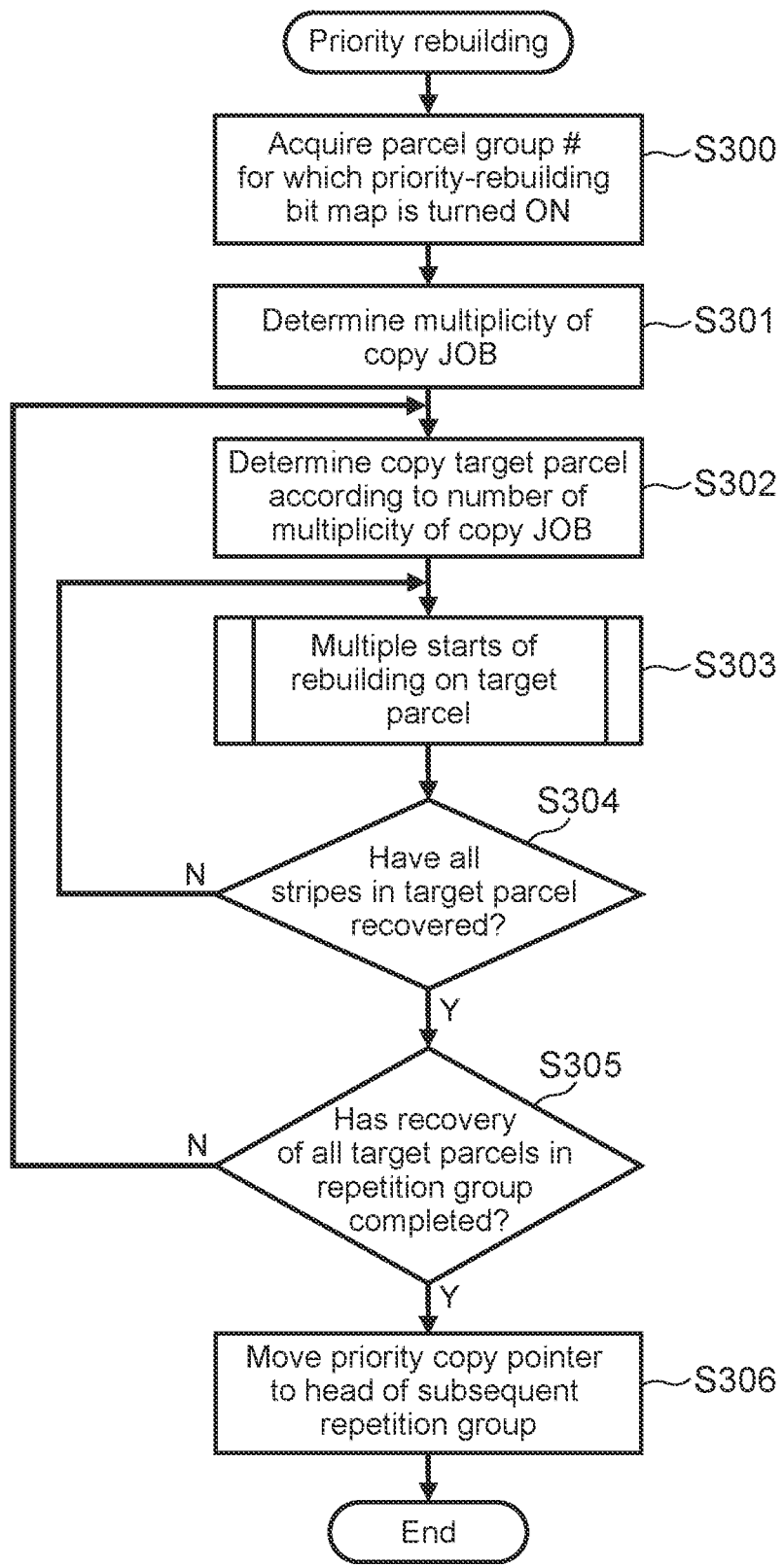
FIG. 19 is a flowchart for explaining an example of the priority rebuilding of the storage system according to embodiment 1.

FIG. 19 is a flowchart for explaining an example of the priority rebuilding of the storage system 10 according to embodiment 1. The flowchart in FIG. 19 indicates the detail of the processing of step S104 in the flowchart of FIG. 17.

The rebuilding program 132 first acquires the parcel group # for which the priority-rebuilding bit map 306 is turned ON, from the priority-rebuilding bit map 306 with reference to the rebuild management table 135 (step S300).

The rebuilding program 132 then determines the multiplicity of a parcel copy job (step S301). Subsequently, the rebuilding program 132 determines copy target parcels according to the number of the multiplicity of the parcel copy job determined in step S301 (step S302). The rebuilding program 132 then makes multiple starts of rebuilding on the copy target parcels determined in step S302 (step S303). The processing of step S303 is repeated until the recovery of all stripes in the target parcel is completed (YES in step S304).

Thereafter, the rebuilding program 132 determines whether all target parcels in the repetition group have been recovered or not (step S305). If the determination result is positive (YES in step S305), the rebuilding program 132 moves the priority copy pointer 305 of the rebuild management table 135 to the head of the subsequent repetition group (step S306). If the determination result is negative (NO in step S305), the processing is returned to step S302.

Figure 20:
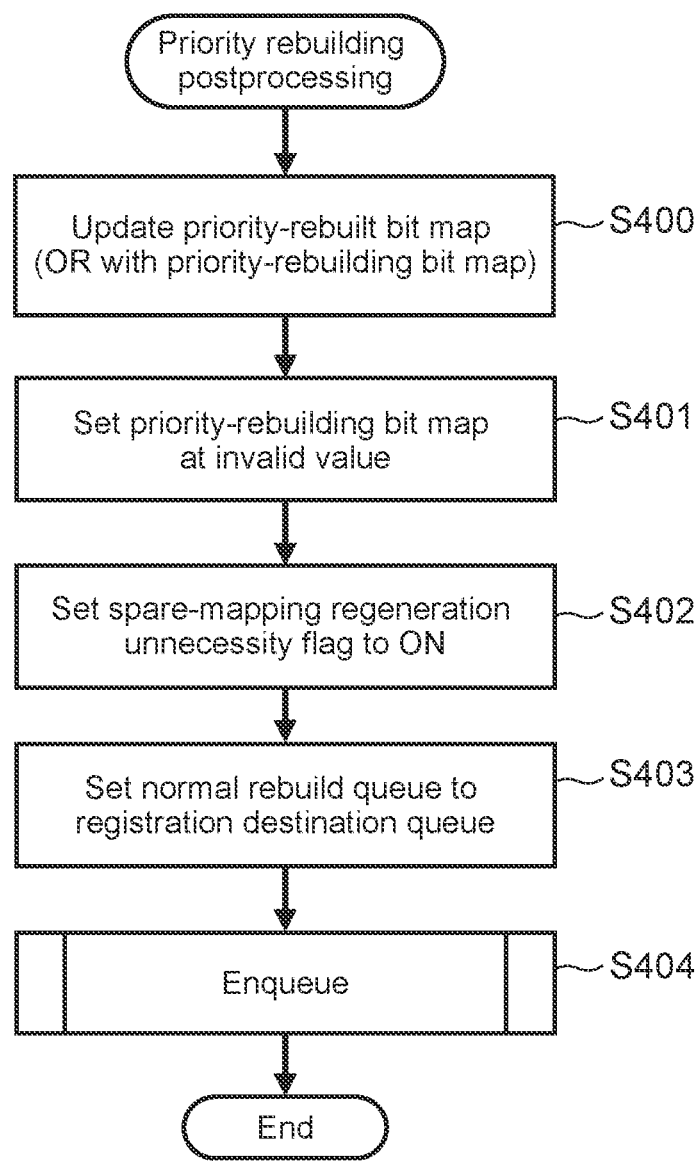
FIG. 20 is a flowchart indicating an example of the priority rebuilding postprocessing of the storage system according to embodiment 1.

FIG. 20 is a flowchart indicating an example of the priority rebuilding postprocessing of the storage system 10 according to embodiment 1. The flowchart in FIG. 20 indicates the detail of the processing of step S106 in the flowchart of FIG. 17.

The rebuilding program 132 first updates the priority-rebuilt bit map 307 of the rebuild management table 135 (step S400). The priority-rebuilt bit map 307 may be updated by an OR with the priority-rebuilding bit map 306. The rebuilding program 132 then sets the value of the priority-rebuilding bit map 306 of the rebuild management table 135 at an invalid value (step S401).

Thereafter, the rebuilding program 132 sets a spare-mapping regeneration unnecessity flag to ON (step S402), sets a normal rebuild queue to a registration destination queue (step S403), and performs an enqueue (step S404).

Figure 21:
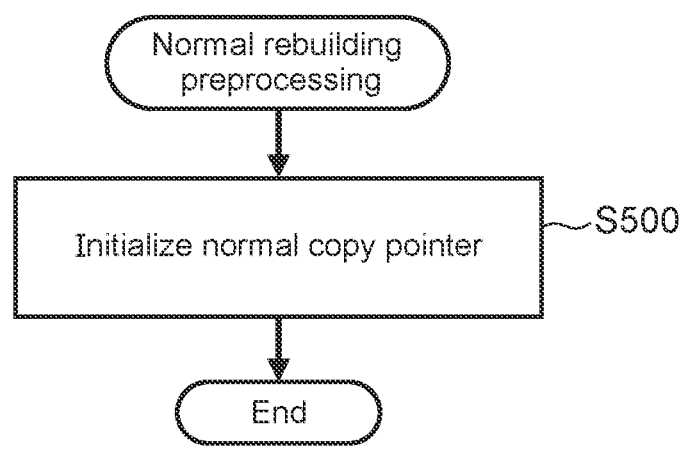
FIG. 21 is a flowchart for explaining an example of the normal rebuilding preprocessing of the storage system according to embodiment 1.

FIG. 21 is a flowchart for explaining an example of the normal rebuilding preprocessing of the storage system 10 according to embodiment 1. The flowchart in FIG. 21 indicates the detail of the processing of step S107 in the flowchart of FIG. 17.

The rebuilding program 132 initializes the normal copy pointer 304 of the rebuild management table 135 (step S500).

Figure 22:
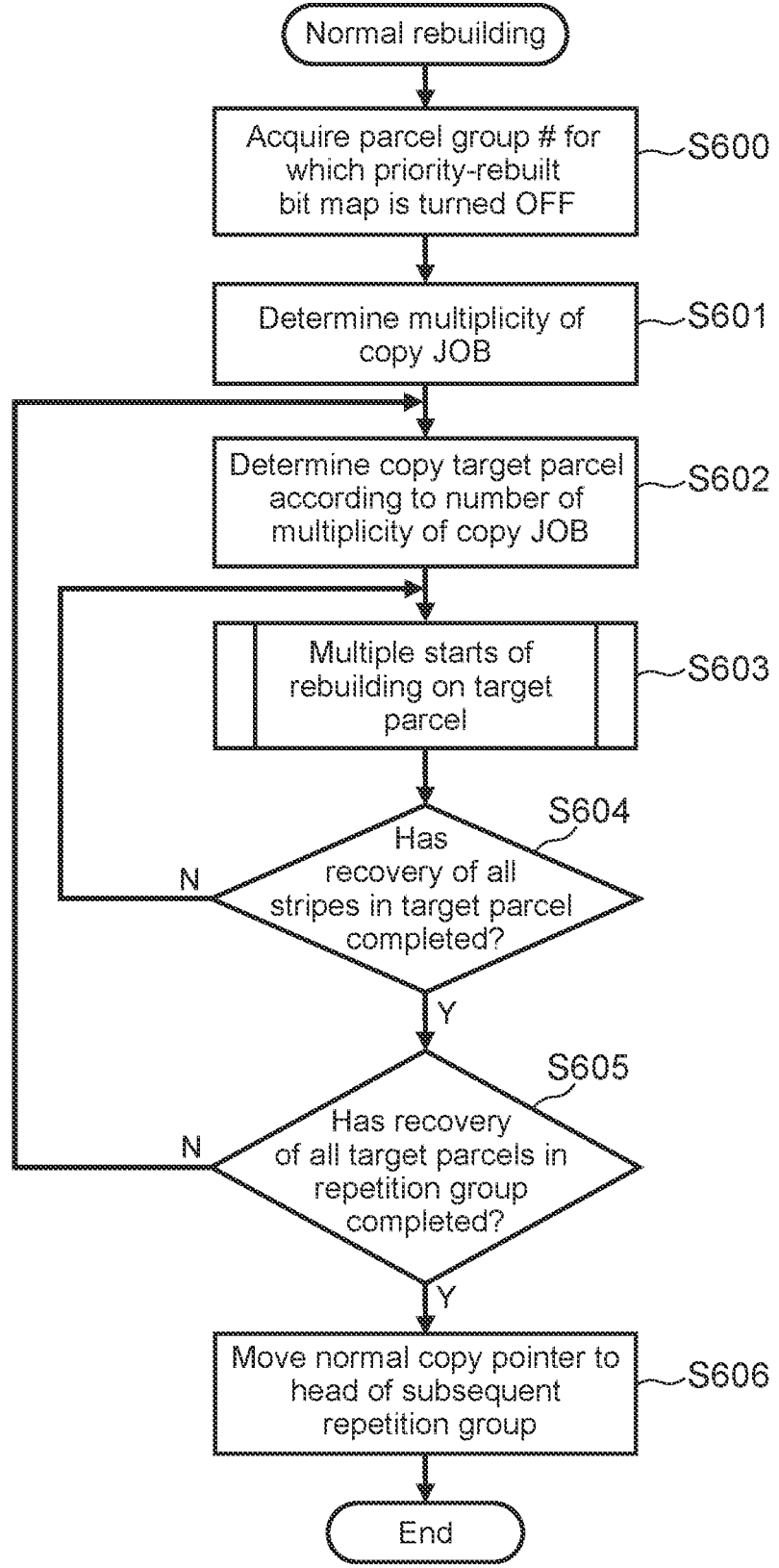
FIG. 22 is a flowchart for explaining an example of the normal rebuilding of the storage system according to embodiment 1.

FIG. 22 is a flowchart for explaining an example of the normal rebuilding of the storage system 10 according to embodiment 1. The flowchart in FIG. 22 indicates the detail of the processing of step S108 in the flowchart of FIG. 17.

The rebuilding program 132 first acquires the parcel group # for which the priority-rebuilding bit map 306 is turned OFF, from the priority-rebuilding bit map 306 with reference to the rebuild management table 135 (step S600).

The rebuilding program 132 then determines the multiplicity of a parcel copy job (step S601). Subsequently, the rebuilding program 132 determines copy target parcels according to the number of the multiplicity of the parcel copy job determined in step S601 (step S602). The rebuilding program 132 then makes multiple starts of rebuilding on the copy target parcels determined in step S602 (step S603). The processing of step S603 is repeated until the recovery of all stripes in the target parcel is completed (YES in step S604).

Thereafter, the rebuilding program 132 determines whether all target parcels in the repetition group have been recovered or not (step S605). If the determination result is positive (YES in step S605), the rebuilding program 132 moves the normal copy pointer 304 of the rebuild management table 135 to the head of the subsequent repetition group (step S606). If the determination result is negative (NO in step S605), the processing is returned to step S602.

Figure 23:
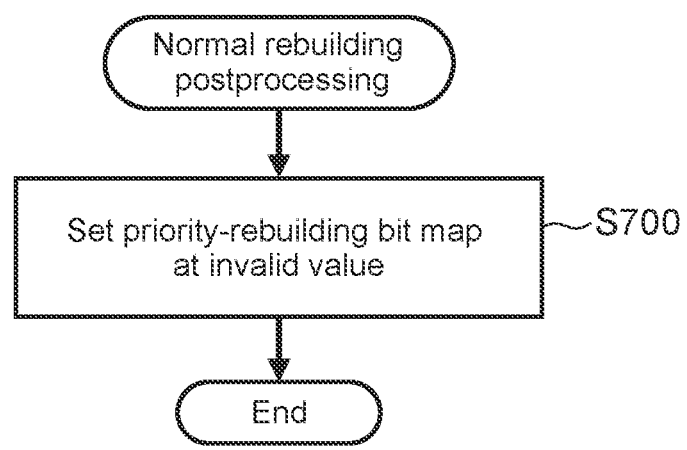
FIG. 23 is a flowchart indicating an example of the normal rebuilding postprocessing of the storage system according to embodiment 1.

FIG. 23 is a flowchart indicating an example of the normal rebuilding postprocessing of the storage system 10 according to embodiment 1. The flowchart in FIG. 23 indicates the detail of the processing of step S110 in the flowchart of FIG. 17.

The rebuilding program 132 sets the priority-rebuilt bit map 307 of the rebuild management table 135 at an invalid value (step S700).

According to the present embodiment configured thus, the storage controller 100 performs, in rebuilding which is performed when failures occur in at least two drives (storage devices 200) and in which data stored in the faulty drive to another drive is stored, priority rebuilding such that priority rebuild data to be preferentially rebuilt is selected and then is rebuilt using the reading drive specified for reading data for the restoration of the priority rebuild data and the writing drive specified for writing the restored priority rebuild data, and rebuilds normal rebuild data that is data other than the priority rebuild data by using a specified reading drive and a specified writing drive.

Thus, according to the present embodiment, normal rebuilding can be performed in parallel with priority rebuilding. This can increase the speed of restoration of data stored in the faulty drive in the storage system having the distributed RAID configuration.

After the completion of priority rebuilding, the storage controller 100 rebuilds data that has not been restored by the priority rebuilding and normal rebuilding, achieving quick and reliable rebuilding for the faulty drive.

Moreover, the storage controller 100 performs priority rebuilding such that priority rebuild data is selected based on the redundancy of data, particularly data having lower redundancy is selected and rebuilt as priority rebuild data from data stored in the faulty drive, and performs normal rebuilding on normal rebuild data that is data having higher redundancy than that of the priority rebuild data. Thus, rebuilding can be performed while reliably preventing a data loss that may occur in the worst case.

Furthermore, during normal rebuilding, the storage controller 100 performs rebuilding without specifying the writing drive nor the reading drive that are specified as the writing drive and the reading drive in priority rebuilding, so that normal rebuilding can be performed during priority rebuilding without affecting the priority rebuilding. This can increase the speed of restoration of data stored in the faulty drive in the storage system having the distributed RAID configuration.

Modification of Embodiment 1

The storage system 10 of embodiment 1 has a RAID level of RAID 6 (2D+2P) and includes four parcels constituting the parcel group. Thus, the faulty drive (storage device 200) includes one parcel of the parcel group and the parcel group can be rebuilt by reading at least two parcels during the rebuilding of the parcel group.

Hence, in the modification of embodiment 1, in the presence of the storage device 200 where the parcels are not read or written other than a reading drive and a writing drive that are the storage devices 200 where two parcels out of three parcels belonging to the same parcel group are read and written during priority rebuilding, normal rebuilding is performed using parcels that are stored in the storage device 200 (drive) and that are targets of normal rebuilding.

Figure 16:
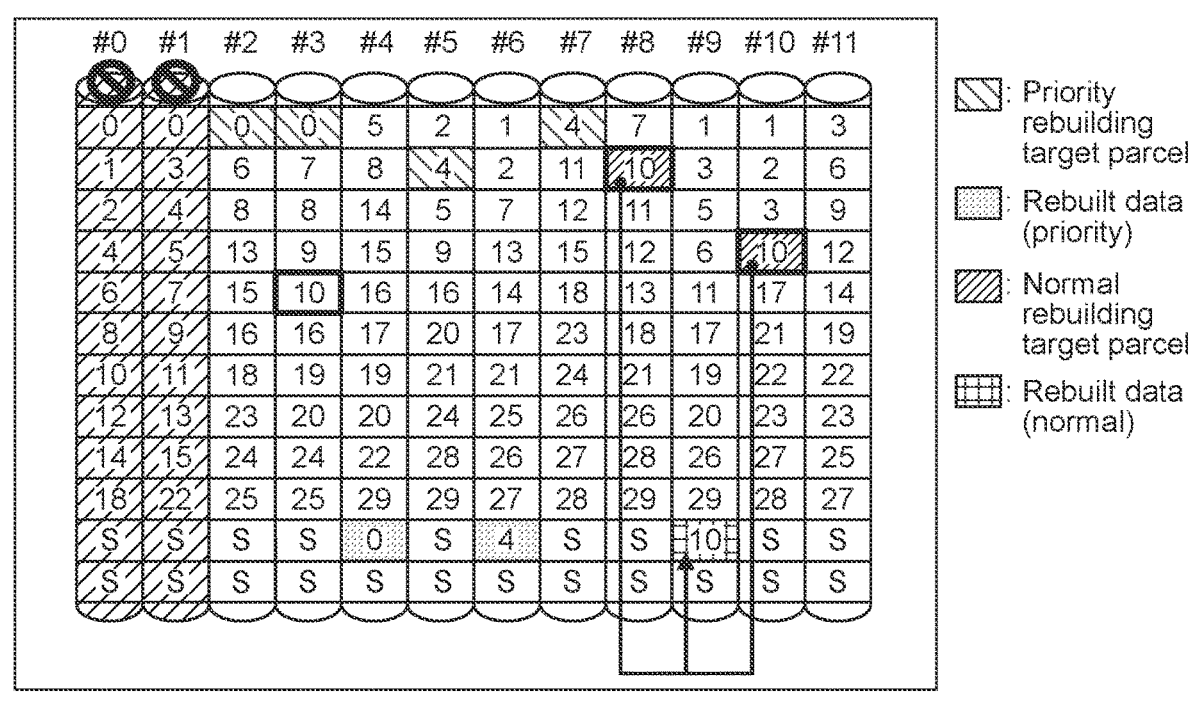

Specifically, as illustrated in FIG. 16, from among the drives where parcels belonging to the parcel group #10 are stored, the drive #3 is used as a reading drive for priority rebuilding but the drives #8 and #10 are not used as reading drives or writing drives for priority rebuilding. Therefore, the storage controller 100 performs normal rebuilding using parcels stored in the drives #8 and #10. At this point, the drive #9 is specified as a writing drive according to spare mapping. The drive #9 is not used as a reading drive or a writing drive for priority rebuilding.

This can provide more options for drives used for normal rebuilding performed in parallel with priority rebuilding and increase the speed of restoration of data stored in a faulty drive.

Embodiment 2

A storage system 10 of embodiment 2 has a RAID level of RAID 6 (2D+2P) and includes 12 drives (storage devices 200). At this point, in a data mapping table 137 (FIG. 5), data is mapped so as to equalize the number of read parcels in drives as much as possible during rebuilding. This eliminates a bottleneck in the performance of the drives, the bottleneck being created by an uneven number of read parcels in the drives during rebuilding, so that the rebuilding time can be shortened.

However, in an ordinary storage system, only the drive including the target parcels of priority rebuilding is selected in priority rebuilding and then rebuilding is performed. This leads to an uneven number of read parcels in the drives during priority rebuilding, so that a bottleneck in the performance of the drives may extend the entire rebuilding time.

Hence, in the storage system 10 of embodiment 2, from among reading drives and writing drives that are the storage devices 200 for reading and writing parcels during priority rebuilding, the number of read parcels of the drive that reads the maximum number of parcels and the number of written parcels of the drive that writes the maximum number of parcels are acquired. Subsequently, the target parcels of normal rebuilding are selected so as to perform rebuilding such that the number of read parcels and the number of written parcels in the drives do not exceed the acquired maximum number of read parcels and the acquired maximum number of written parcels, and then normal rebuilding is performed in parallel with priority rebuilding by using the selected target parcels of normal rebuilding. This eliminates a bottleneck in the performance of the drives, the bottleneck being created by an uneven number of read parcels in the drives during rebuilding, so that the entire rebuilding time can be further shortened.

Figure 24:
FIG. 24 is an explanatory drawing illustrating an example of the flow of rebuilding in a storage system according to embodiment 2.

Specifically, in the upper part of FIG. 24, the drives #2, #3, #5, and #7 are used as reading drives during priority rebuilding. Up to one parcel is read from one reading drive. Moreover, the drives #4 and #6 are used as writing drives during priority rebuilding. Up to one parcel is written in one writing drive. Hence, the storage controller 100 performs rebuilding after reading the parcels of the parcel group #1 stored in the drives #9 and #10 where the number of read parcels is one or less, and writes the rebuilt parcels into the drive #2 where the number of written parcels is one or less.

Figure 25:
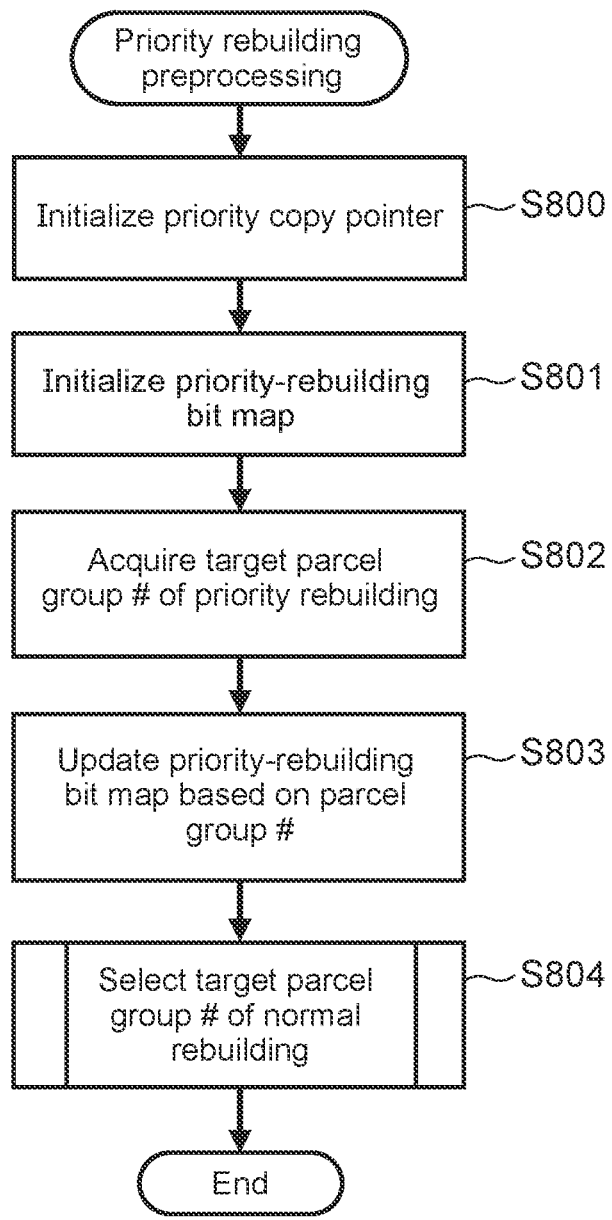
FIG. 25 is a flowchart for explaining an example of the priority rebuilding preprocessing of the storage system according to embodiment 2.

FIG. 25 is a flowchart for explaining an example of the priority rebuilding preprocessing of the storage system 10 according to embodiment 2.

A rebuilding program 132 first initializes a priority copy pointer 305 of a rebuild management table 135 (step S800). The rebuilding program 132 then initializes a priority-rebuilding bit map 306 of the rebuild management table 135 (step S801).

The rebuilding program 132 then acquires a parcel group # as a target of priority rebuilding with reference to a parcel-group redundancy management table 138 (step S802). The rebuilding program 132 then updates the priority-rebuilding bit map 306 of the rebuild management table 135 based on the parcel group # acquired in step S802 (step S803).

The rebuilding program 132 selects a target parcel group of normal rebuilding (step S804). The selection of the target parcel group of normal rebuilding will be specifically described later.

Figure 26:
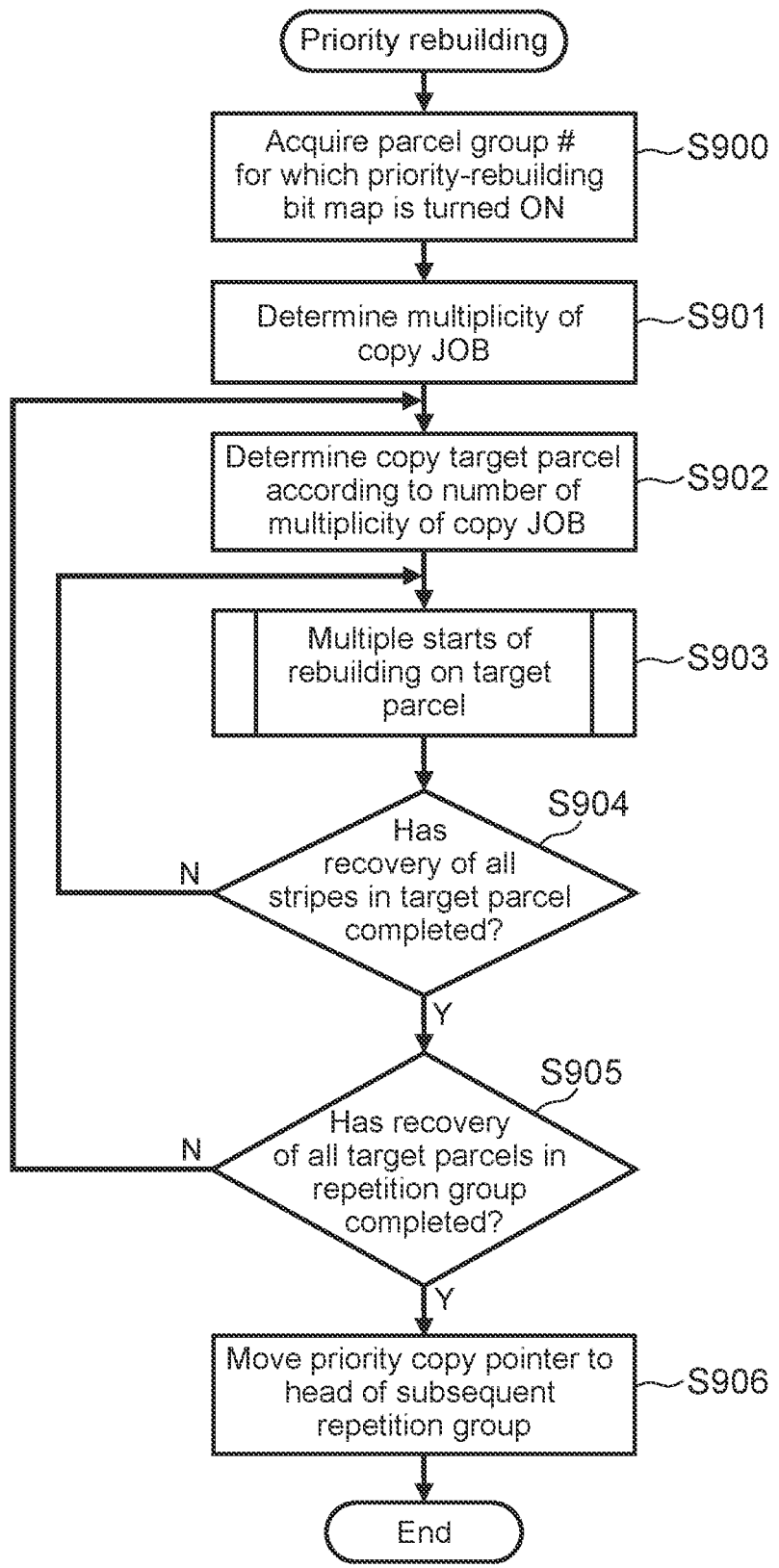
FIG. 26 is a flowchart for explaining an example of the priority rebuilding of the storage system according to embodiment 2.

FIG. 26 is a flowchart for explaining an example of the priority rebuilding of the storage system 10 according to embodiment 2.

The rebuilding program 132 first acquires the parcel group # for which the priority-rebuilding bit map 306 is turned ON, from the priority-rebuilding bit map 306 with reference to the rebuild management table 135 (step S900).

The rebuilding program 132 then determines the multiplicity of a parcel copy job (step S901). Subsequently, the rebuilding program 132 determines copy target parcels according to the number of the multiplicity of the parcel copy job determined in step S901 (step S902). The rebuilding program 132 then makes multiple starts of rebuilding on the copy target parcels determined in step S902 (step S903). The processing of step S903 is repeated until the recovery of all stripes in the target parcel is completed (YES in step S904).

Thereafter, the rebuilding program 132 determines whether all target parcels in a repetition group have been recovered or not (step S905). If the determination result is positive (YES in step S905), the rebuilding program 132 moves the priority copy pointer 305 of the rebuild management table 135 to the head of the subsequent repetition group (step S906). If the determination result is negative (NO in step S905), the processing is returned to step S902.

Figure 27:
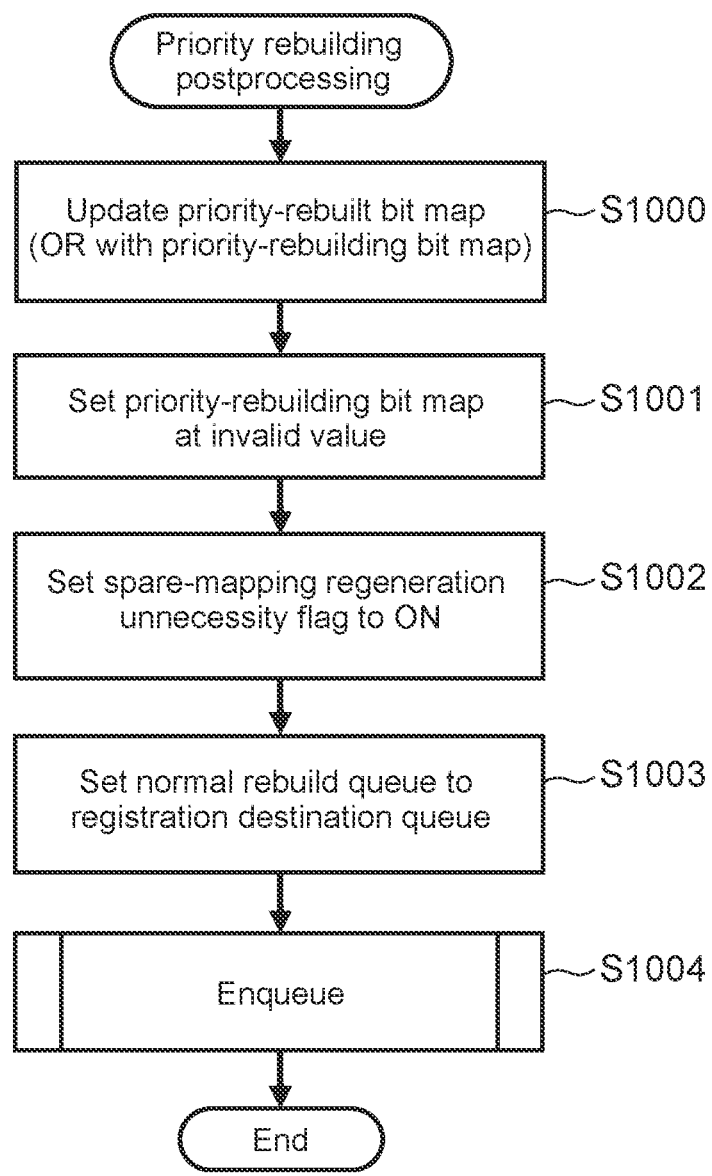
FIG. 27 is a flowchart indicating an example of the priority rebuilding postprocessing of the storage system according to embodiment 2.

FIG. 27 is a flowchart indicating an example of the priority rebuilding postprocessing of the storage system 10 according to embodiment 2.

The rebuilding program 132 first updates a priority-rebuilt bit map 307 of the rebuild management table 135 (step S1000). The priority-rebuilt bit map 307 may be updated by an OR with the priority-rebuilding bit map 306. The rebuilding program 132 then sets the value of the priority-rebuilding bit map 306 of the rebuild management table 135 at an invalid value (step S1001).

Thereafter, the rebuilding program 132 sets a spare-mapping regeneration unnecessity flag to ON (step S1002), sets a normal rebuild queue to a registration destination queue (step S1003), and performs an enqueue (step S1004).

Figure 28:
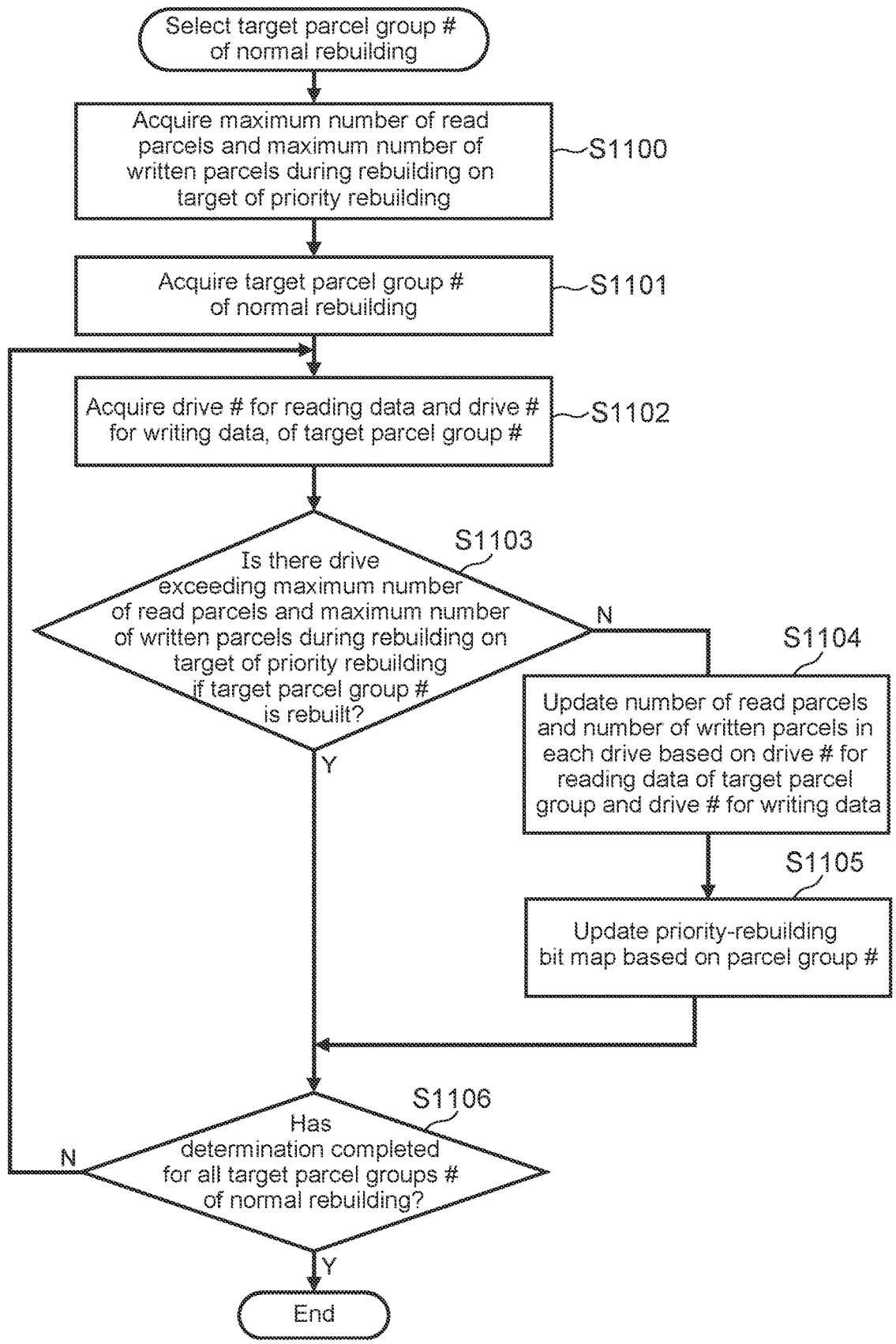
FIG. 28 is a flowchart indicating an example of the selection of a target parcel group of normal rebuilding in the storage system according to embodiment 2.

FIG. 28 is a flowchart indicating an example of the selection of a target parcel group of normal rebuilding in the storage system 10 according to embodiment 2. The flowchart in FIG. 28 indicates the detail of the processing of step S804 in the flowchart of FIG. 25.

First, from among the target drives of priority rebuilding during priority rebuilding, the rebuilding program 132 acquires the number of read parcels of the drive for reading the maximum number of parcels and the number of written parcels of the drive for writing the maximum number of parcels (step S1100).

The rebuilding program 132 then acquires a parcel group # as a target of normal rebuilding from the parcel-group redundancy management table 138 (step S1101).

The rebuilding program 132 then acquires the drive # (storage device 200) for reading data and the drive # for writing data if the target parcel group # is rebuilt, from the parcel group # acquired in step S1101 (step S1102).

The rebuilding program 132 then determines, if the target parcel group # is rebuilt, the presence or absence of a drive exceeding the maximum number of read parcels and the maximum number of written parcels that are acquired in step S1100 (step S1103).

If the determination result is positive (YES in step S1103), the program advances to step S1105. If the determination result is negative (NO in step S1103), the number of read parcels and the number of written parcels are updated in each of the drives based on the drive # for reading the data of the target parcel group and the drive # for writing data (step S1104). Moreover, the priority-rebuilding bit map 306 is updated based on the target parcel group # (step S1105). Thereafter, the program advances to step S1106.

In step S1106, it is determined whether the determination in step S1103 has been completed or not for all target normal rebuilding operations. If the determination result is positive, the flowchart of FIG. 28 is completed. If the determination result is negative, the process returns to step S1102.

Embodiment 3

In a storage system 10 of embodiment 3, a reading drive and a writing drive for normal rebuilding performed in parallel with priority rebuilding are selected using a concept called drive load. Generally, a load applied to a drive (storage device 200) varies between a data reading operation and a data writing operation. Hence, a drive load is defined by the following equation:

Drive load=(the number of read parcels×α)+(the number of written parcels×β)

where α and β are constants that have different values for each kind of drive. Thus, it is necessary to determine the constants α and β in advance. In the following explanation, α=1 and β=2 are defined. Moreover, a reading drive and a writing drive are selected such that the drive load does not exceed a maximum drive load when only priority rebuilding is performed, and normal rebuilding for normal rebuild data is performed in synchronization with the priority rebuilding. This can level out the influence on the drives and thus eliminate a bottleneck in the performance of the drives, the bottleneck being created by an uneven drive load, so that the entire rebuilding time can be further shortened.

Figure 29:
FIG. 29 is an explanatory drawing illustrating an example of the flow of rebuilding in a storage system according to embodiment 3.

Specifically, in the upper part of FIG. 29, parcel groups #0 and #4 are the targets of priority rebuilding. The maximum drive load is 2 when only priority rebuilding is performed. Parcels may be read or written as long as the drive load does not exceed 2, so that two parcels can be simultaneously read in the same drive but writing is limited to one parcel.

As illustrated in the upper part of FIG. 29, parcels belonging to the parcel group #0 are read as priority rebuilding in, for example, the drive #2; meanwhile, parcels belonging to the parcel group #18 can be read. In the writing of rebuilt data, parcels belonging to the parcel group #0 are written in the spare area of the drive #4 in a distributed manner and parcels belonging to the parcel group #18 are written in the spare area of the drive #11 in a distributed manner.

After the completion of priority rebuilding, normal rebuilding is performed as illustrated in the lower part of FIG. 29. FIG. 29 indicates drive loads during priority rebuilding and normal rebuilding for reference. As indicated in FIG. 29, in the case of normal rebuilding alone, a drive load may exceed the maximum drive load when only priority rebuilding is performed.

Figure 30:
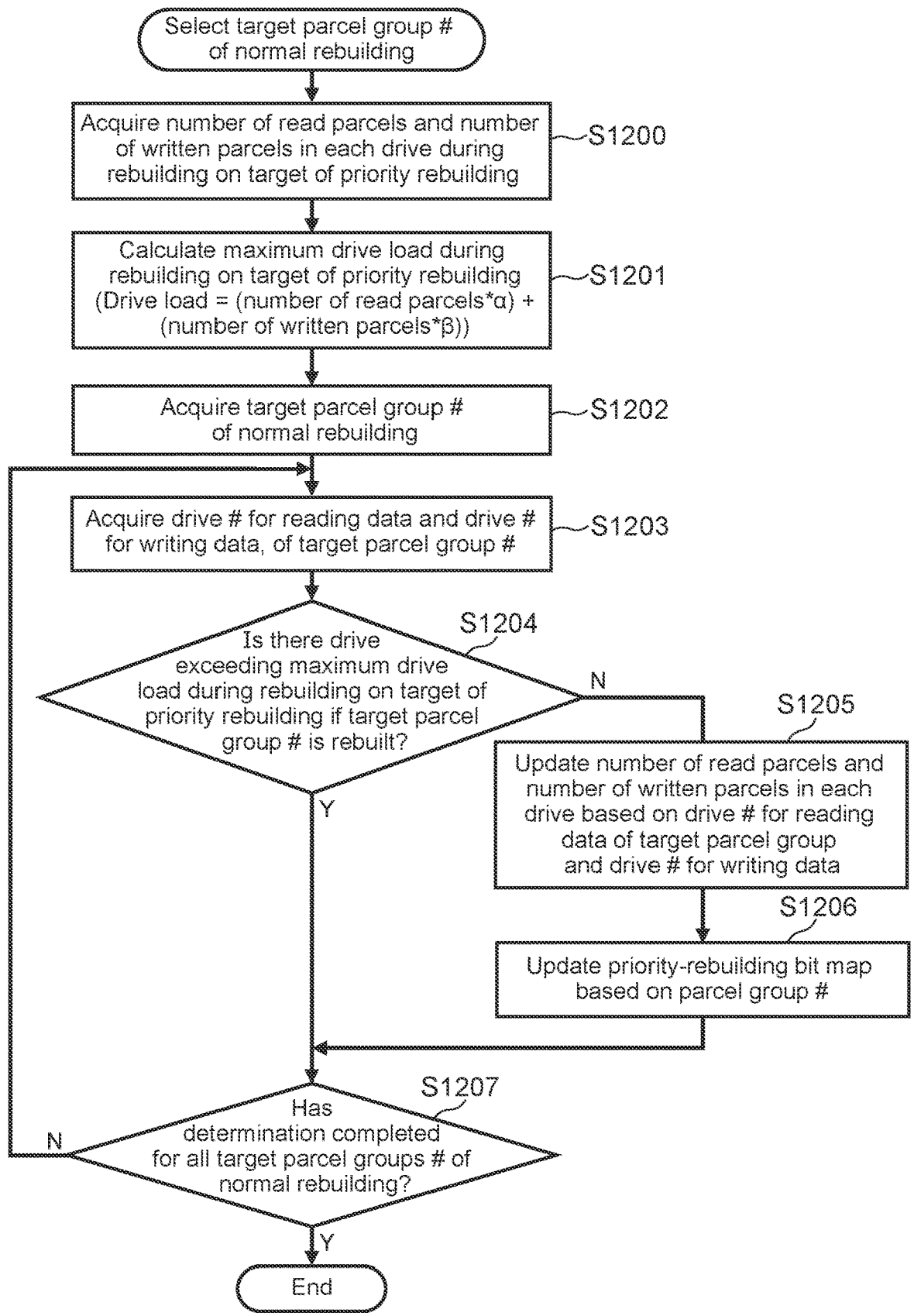
FIG. 30 is a flowchart indicating an example of the selection of a target parcel group of normal rebuilding in the storage system according to embodiment 3.

FIG. 30 is a flowchart indicating an example of the selection of a target parcel group of normal rebuilding in the storage system 10 according to embodiment 3.

First, the rebuilding program 132 acquires the number of read parcels and the number of written parcels of the drives that are the target drives of priority rebuilding during priority rebuilding (step S1200).

The rebuilding program 132 then calculates a maximum drive load when only priority rebuilding is performed (step S1201).

The rebuilding program 132 then acquires a parcel group # as a target of normal rebuilding from the parcel-group redundancy management table 138 (step S1202).

The rebuilding program 132 then acquires the drive # (storage device 200) for reading data and the drive # for writing data if the target parcel group # is rebuilt, from the parcel group acquired in step S1202 (step S1203).

The rebuilding program 132 then determines, if the target parcel group is rebuilt, the presence or absence of a drive exceeding the maximum drive load when only priority rebuilding is performed (step S1204).

If the determination result is positive (YES in step S1204), the program advances to step S1206. If the determination result is negative (NO in step S1204), the number of read parcels and the number of written parcels are updated in each of the drives based on the drive # for reading the data of the target parcel group and the drive # for writing data (step S1205). Moreover, the priority-rebuilding bit map 306 is updated based on the target parcel group (step S1206). Thereafter, the program advances to step S1207.

In step S1207, the rebuilding program 132 determines whether the determination in step S1204 has been completed or not for all target normal rebuilding operations. If the determination result is positive, the flowchart of FIG. 30 is completed. If the determination result is negative, the process returns to step S1203.

The embodiments specifically described the configurations to illustrate the present invention. All the described configurations are not necessary for the present invention. Alternatively, the configurations of the embodiments can partially include additional configurations, can be partially deleted, or can be partially replaced with other configurations.

The configurations, functions, processing unit, and processing means may be implemented by hardware, for example, an integrated circuit design. Alternatively, the present invention can be implemented by the program codes of software for implementing the functions of the embodiments. In this case, a storage medium in which the program codes are recorded is provided for a computer and a processor included in the computer reads the program codes stored in the storage medium. In this case, the program codes read from the storage medium implement the functions of the embodiments, so that the program codes and the storage medium for storing the program codes constitute the present invention. Storage media for supplying such a program code include, for example, a flexible disk, a CD-ROM, a DVD-ROM, a hard disk, SSD (Solid State Drive), an optical disk, a magneto-optical disk, a CD-R, a magnetic tape, a non-volatile memory card, and a ROM.

Furthermore, the programs codes for implementing the functions described in the embodiments can be implemented by, for example, a wide range of programs or script languages such as an assembler, C/C++, perl, Shell, PHP, and Java (registered trademark).

The embodiments describe control lines and information lines that are necessary for explanation and do not describe all the control lines and information lines of the product. All of the configurations may be coupled to one another.

What is claimed is:

1. A storage system comprising a plurality of drives and a processor configured to construct a distributed RAID including the drives,
    wherein the processor is configured to perform, in rebuilding which is performed when failures occur in at least two drives of the plurality of drives and in which data stored in the at least two drives in which the failures occur is restored to another drive of the plurality of drives, priority rebuilding and normal rebuilding in parallel, the priority rebuilding being performed such that priority rebuild data to be preferentially rebuilt is selected and then is rebuilt using a reading drive specified for reading the data for restoration of the priority rebuild data and a writing drive specified for writing the priority rebuild data restored, the normal rebuilding being performed such that normal rebuild data that is the data other than the priority rebuild data is rebuilt using a specified reading drive and a specified writing drive.

2. The storage system according to claim 1, wherein the processor is configured to rebuild the data that has not been restored by the priority rebuilding and the normal rebuilding, after completion of the priority rebuilding.

3. The storage system according to claim 1, wherein the processor is configured to select the priority rebuild data based on redundancy of the data.

4. The storage system according to claim 3, wherein the processor is configured to perform the priority rebuilding on the data having lower redundancy selected as the priority rebuild data from the data stored in the drives in which the failures occur, and perform the normal rebuilding on the data having higher redundancy than that of the priority rebuild data, as the normal rebuild data.

5. The storage system according to claim 1,
wherein each of the plurality of drives has a spare area, and
the processor is configured to write the data in the spare area during the rebuilding.

6. The storage system according to claim 1,
wherein data stored in each of the plurality of drives includes sets of user data and redundancy data, the user data being instructed to be written from a host computer disposed outside the storage system, the redundancy data being generated based on the user data, and
the processor is configured to perform the rebuilding for each of the sets of the user data and the redundancy data.

7. The storage system according to claim 1, wherein the processor is configured to perform the rebuilding without specifying the writing drive nor the reading drive that are specified as the writing drive and the reading drive in the priority rebuilding, as the writing drive and the reading drive in the normal rebuilding.

8. The storage system according to claim 1,
wherein parcels belonging to a single parcel group are stored in two or more of the plurality of drives, and
the processor is configured to perform, in the normal rebuilding, when at least one of the parcels belonging to the single parcel group is stored in the writing drive specified as the writing drive in the priority rebuilding, the rebuilding using the parcels belonging to the single parcel group stored in the two or more of the plurality of drives other than the writing drive specified in the priority rebuilding.

9. The storage system according to claim 1,
wherein parcels belonging to a single parcel group are stored in two or more of the plurality of drives, and
the processor is configured to perform the normal rebuilding by using parcels that are selected so as to perform the normal rebuilding without exceeding a number of parcels of a reading drive that reads a maximum number of parcels and a number of parcels of a writing drive that writes a maximum number of parcels in the priority rebuilding.

10. The storage system according to claim 1,
wherein the processor is configured to perform the rebuilding using the writing drive and the reading drive that are specified based on a predetermined drive load ratio of the writing drive and the reading drive in the normal rebuilding.

11. A rebuilding method in a storage system comprising a plurality of drives and a processor configured to construct a distributed RAID including the drives, the rebuilding method comprising:
performing, in rebuilding which is performed when failures occur in at least two drives of the plurality of drives and in which data stored in the at least two drives in which the failures occur is restored to another drive of the plurality of drives, priority rebuilding and normal rebuilding in parallel, the priority rebuilding being performed such that priority rebuild data to be preferentially rebuilt is selected and then is rebuilt using a reading drive specified for reading the data for restoration of the priority rebuild data and a writing drive specified for writing the priority rebuild data restored, the normal rebuilding being performed such normal rebuild data that is the data other than the priority rebuild data is rebuilt using a specified reading drive and a specified writing drive.

* * * * *